United States Patent [19]
Lamb

[11] Patent Number: 5,166,899
[45] Date of Patent: Nov. 24, 1992

[54] LOOKAHEAD ADDER

[75] Inventor: Joel D. Lamb, Fort Collins, Colo.

[73] Assignee: Hewlett-Packard Company, Palo Alto, Calif.

[21] Appl. No.: 554,612

[22] Filed: Jul. 18, 1990

[51] Int. Cl.$^5$ .............................................. G06F 7/52
[52] U.S. Cl. ...................................................... 364/787
[58] Field of Search ......................................... 364/787

[56] References Cited

U.S. PATENT DOCUMENTS

| | | | |
|---|---|---|---|
| 3,805,045 | 4/1974 | Larson | 364/787 |
| 4,764,886 | 8/1988 | Yano | 364/787 |
| 4,858,168 | 8/1989 | Hwang | 364/787 |
| 5,047,974 | 9/1991 | Young | 364/787 |

OTHER PUBLICATIONS

Schmookler et al, "Group-Carry Generator" *IBM Tech. Disclosure Bulletin* vol. 6 No. 1 Jun. '63 pp. 77–78.
"Pipelined Carry-Lookahead Adder for Fixed-Point Arithmetic" *IBM Tech. Disclosure Bulletin* vol. 28 No. 9 Feb. '86 pp. 4106–4108.

*Primary Examiner*—David H. Malzahn

[57] ABSTRACT

In a lookahead adder of the type wherein carry signals for successive stages of the adder are derived by a pyramid of hierarchically-arranged logic circuits, supplemented by carry signals from intermediate ones of the adder stages. The need to rely on such intermediate carry signals is dispensed with by additional non-hierarchically-arranged logic circuits whose outputs provide the information previously derived from intermediate carry outputs.

8 Claims, 20 Drawing Sheets

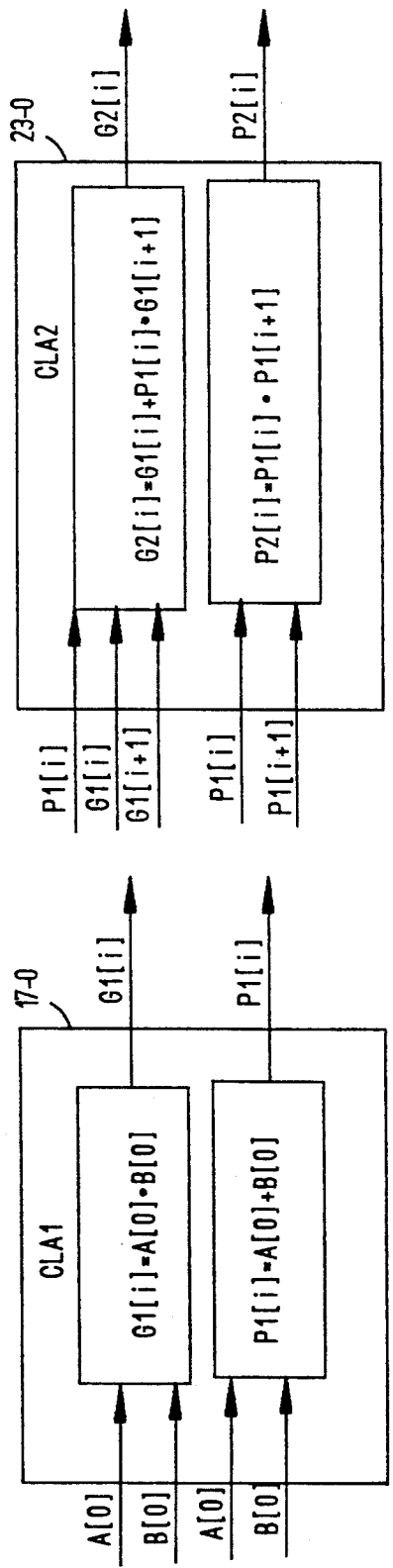
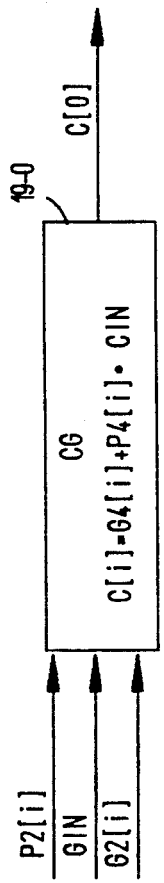
FIG 5
FIG 6
FIG 4

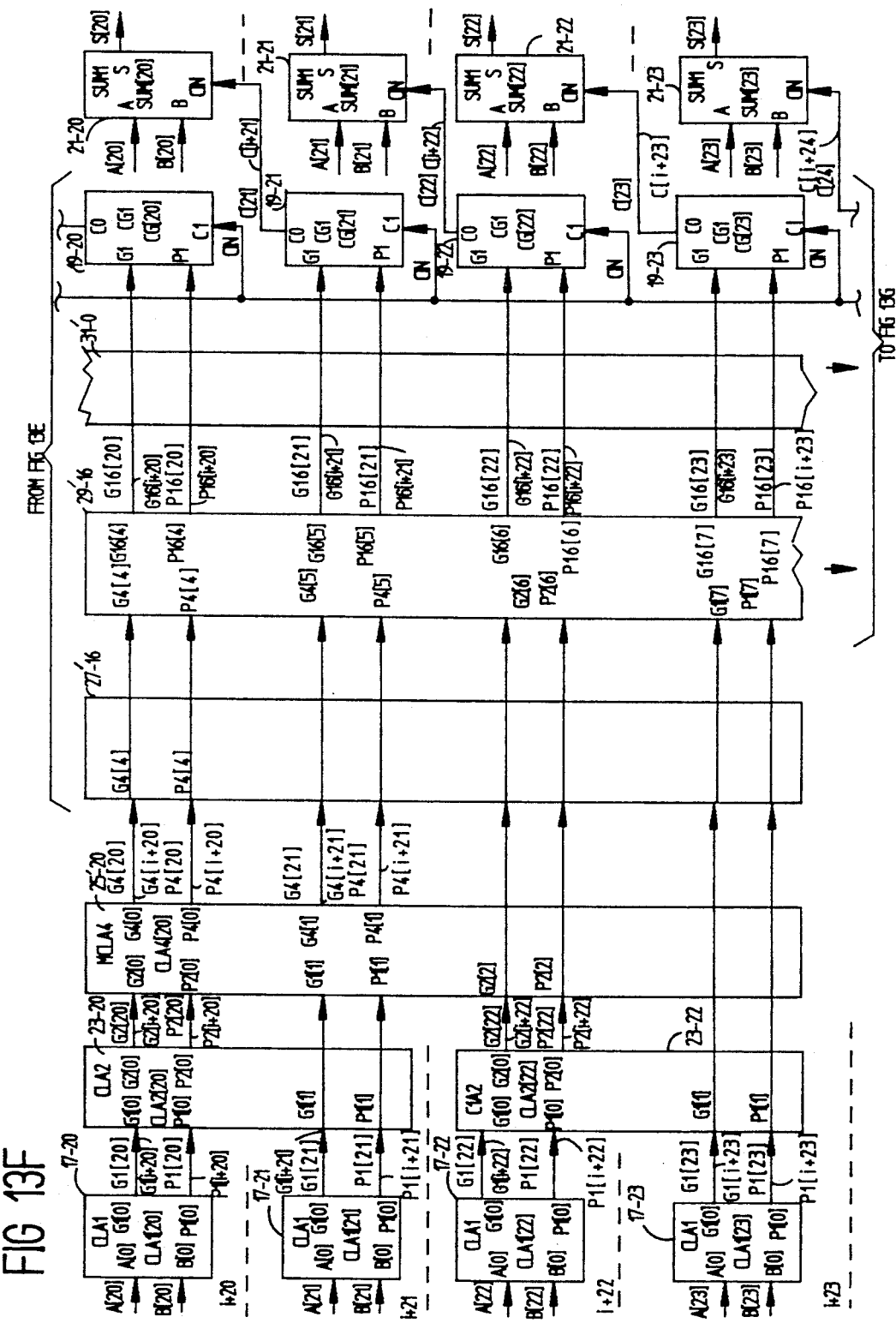

LOOKAHEAD ADDER

BACKGROUND OF THE INVENTION

The present invention is directed to lookahead adders in general and, in particular, to a carry generating circuit for such a lookahead adder.

Conventional serial ripple carry adders are slow, because the carry signal produced in each stage must await the generation of a carry signal by the next-lower-order stage. Lookahead adders seek to overcome this disadvantage by improving the way in which carry signals are generated. Such adders include a series of summing stages, each for adding a respective pair of corresponding bits of two multi-bit binary numbers. Each summing stage has a pair of A and B bit inputs and a carry input. There is associated with each summing stage a generate and a propagate circuit. Each propagate circuit associated with a given summing stage generates a propagate signal if one of its A and B inputs is true, and each of the generate circuits produces an output if both of its A and B inputs are true. The generate and propagate circuits associated with successive pairs of stages have their outputs applied to a common group generate circuit, and, similarly, the propagate circuits associated with successive pairs of summing circuits have their outputs applied to a common group propagate circuit. Thus, in a 4-bit adder, the generate and propagate circuits of the most-significant and second-most-significant bits have their outputs applied to a first pair of group generate and group propagate circuits, while the generate and propagate circuits associated with the third-most-significant and least-significant bits have their outputs applied to a second pair of group generate and group propagate circuits. The two pairs of group generate and group propagate circuits, in turn, have their outputs applied to a single pair of group generate and group propagate circuits. The result is a pyramid of hierarchically-arranged generate, propagate, group generate, and group propagate circuits going from the generate and propagate circuits at the lowest level to a single pair of group generate and group propagate circuits at the highest level, the circuits at the highest level being removed from the lowest-level generate and propagate circuits by a number of levels, which is a function of the total number of bits in the numbers to be added. Thus, in a 32-bit adder, for example, the pyramid comprises 32 pairs of generate and propagate circuits, 16 pairs of group generate and group propagate circuits at a first intermediate level, eight pairs of such circuits at a second intermediate level, four pairs at a third intermediate level, and two pairs at a fourth intermediate level, so that the total number of levels of group generate and group propagate circuits is five.

Returning to the discussion of a four-bit lookahead adder, each stage of the adder includes a carry generating circuit whose function is to derive from the outputs of the generate, propagate, group generate, and group propagate circuits, carry signals for successive summing stages above the least-significant bit stage. In a four-bit adder, the inputs to the first, second, and fourth carry generating stages are provided by the outputs of various ones of the generate, propagate, group generate, and group propagate circuits, and these inputs fully reflect the A and B inputs to the adder. The same is not true, however, of the second-most-significant bit stage, which receives its input from the generate and propagate circuits associated with that stage. This follows from the organization of the pyramid network, wherein the generate, propagate, group generate, and group propagate signals associated with lower bit stages are not applied to the generate and propagate circuits associated with the second-most-significant bit stage. The information which reflects the inputs to those lower stages must come from elsewhere: the output of the carry generate circuit of the third-most-significant bit stage. What the foregoing implies is that the carry signal produced by the carry generating circuit of the second-most-significant stage cannot be produced until the carry signal of the next-lower-order stage has been produced. It is clear that this involves undesirable delay, and, in adders having a larger number of stages, the problem is compounded and the delay increased. It is therefore an object of the present invention to provide a carry generator for a lookahead adder which obviates the need to rely on the outputs of the carry generating circuits associated with respective stages of the adder to produce inputs to the carry generating circuits associated with higher-order stages of the adder.

In accordance with the invention, there is provided a carry generator for a lookahead adder wherein a set of generate, propagate, group generate, and group propagate circuits provides to the carry generate circuits associated with respective summing stages of the adder, generate, propagate, group generate, and group propagate signals which fully reflect the states of the inputs to all stages of the adder so as to obviate the need to apply the output of any carry generate circuit to any other carry generate circuit above it in the chain of carry generate circuits. The ability to provide such a complete complement of generate, propagate, group generate, and group propagate signals is achieved by adding to the conventional hierarchical arrangement of generate, propagate, group generate, and group propagate circuits, additional non-hierarchical group generate and group propagate circuits whose inputs are derived from other circuits which are at different levels in the pyramid of generate, propagate, group generate, and group propagate circuits.

BRIEF DESCRIPTION OF THE DRAWINGS

These features and advantages of the invention, as well as other features and advantages of the invention, will be more apparent from a reading of the claims and of the detailed description of the invention in conjunction with the drawings described below.

FIG. 4 is a block diagram of a pair of generate and propagate circuits forming part of the FIG. 3 adder;

FIG. 5 is a block diagram of a pair of group generate and group propagate circuits forming part of the FIG. 3 adder;

FIG. 6 is a block diagram of the carry generate circuit which forms part of the FIG. 3 adder;

FIGS. 13A-13H are a block diagram of a 32-bit carry lookahead adder built in accordance with the present invention.

DETAILED DESCRIPTION

The goal of a binary adder is to add two binary numbers, together with possibly a carry input, to create a sum and a carry output.

Let the two binary inputs be A and B and let a particular bit of those binary numbers be referred to as $A[i]$ (or $B[i]$), where $A[i]$ (or $B[i]$) is the $i^{th}$ bit of A (or B). Let CIN be the carry into this addition from a previous addition of lower-ordered bits. The resulting sum of A, B, and CIN is represented by S. Let C be an intermediate result of the adder which represents the carry out of each bit stage in the adder.

For a single bit stage of the adder, the sum for that bit stage is:

$$S[i] := (A[i] \text{ xor } B[i] \text{ xor } C[i-1]) \quad (1)$$

In equation (1), "xor" is a binary logic function that can be represented by the following truth table:

TABLE I

| A | B | A xor B |
|---|---|---------|
| 0 | 0 | 0 |
| 0 | 1 | 1 |
| 1 | 0 | 1 |
| 1 | 1 | 0 |

The binary logic function for the sum $S[i]$ can be represented by the following truth table:

TABLE II

| A[i] | B[i] | C[i − 1] | S[i] | C[i] |
|------|------|----------|------|------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The carry $C[i]$ can also be expressed as the following Boolean equation:

$$C[i] := A[i]*B[i] + A[i]*C[i-1] + B[i]*C[i-1] \quad (2)$$

Figure 1:
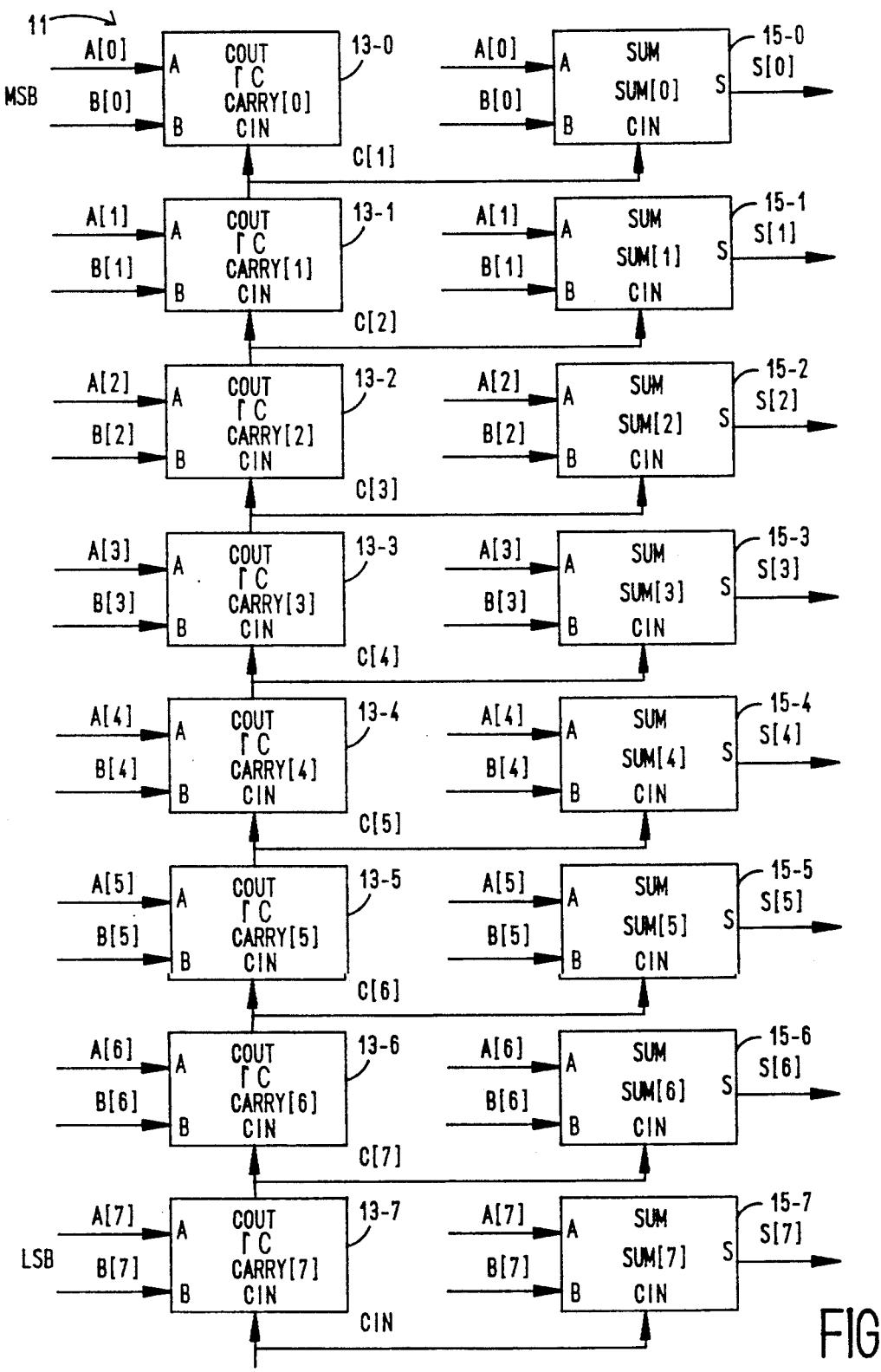
FIG. 1 is a block diagram of a ripple carry adder in which carry signals ripple through a chain of carry generating circuits.

An eight-stage conventional ripple carry adder 11 embodying the above principles is illustrated in FIG. 1. Each stage includes a ripple carry circuit 13 and a summing circuit 15. Ripple carry circuit 13-0 and summing circuit 15-0 comprise the most-significant bit stage, while corresponding circuits 13-7 and 15-7 comprise the least-significant bit stage of the adder. The adder 11 is adapted to add two eight-bit binary numbers A[0] through A[7] and B[0] through B[7]. Successive digits of the binary numbers added by the adder are processed serially. Each of the summing circuits 15-0 through 15-7 has a CIN input to which is applied the COUT output of the ripple carry circuit 13 of the next-less-significant bit stage. A digit of the sum produced by the adder 11 can be calculated once the A and B inputs and the carry input to the summing circuit 15 of that stage are available. The carry signal COUT from that digit can be calculated at the same time. Therefore, the sum for a digit of a particular significance cannot be calculated until all of the carries produced by the ripple carry circuits 13 of the stages of lesser significance have been calculated. Thus, in the eight-bit adder 11 of FIG. 1, the last COUT signal C[0] cannot be calculated until all of the preceding COUT signals C[7] through C[1] have been calculated.

A one-bit carry lookahead adder will be discussed next, to establish the fundamentals of such adders. Shown in FIG. 2, it includes a CLA1 circuit 17, a CG circuit 19, and a sum circuit 21. The CLA1 circuit comprises a generate circuit G1 and a propagate circuit P1 which are implemented as an AND gate and an OR gate, respectively, performing the functions defined by the Boolean equations in the block 17. The carry generate block 19 comprises a complex gate which performs the functions defined by the Boolean equation within the block 19 in FIG. 2. Both the CG circuit 19 and the sum circuit 21 receive a CIN carry input signal from the next-less-significant stage. Sum block 21 provides a sum output S[0] in accordance with Table II.

Figure 2:
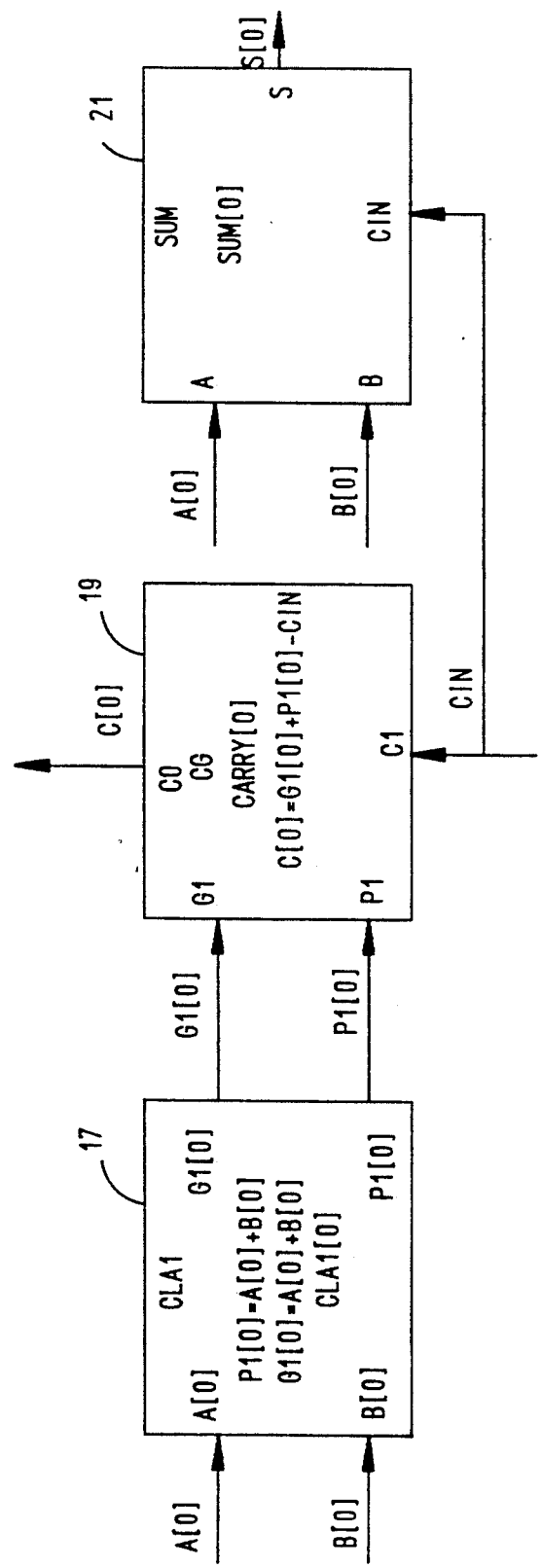
FIG. 2 is a block diagram of a one-bit lookahead adder.

The lookahead adder of FIG. 2 introduces two intermediate values in addition to those which appear in the ripple carry adder 11: the carry generate G1 and the carry propagate P1. The carry generate G1 represents the condition in which the inputs A and B to a bit stage will *generate* a carry from that bit stage without regard to the carry into that bit stage. A carry propagate P1 represents the condition in which the same inputs will *propagate* a carry from the input of the bit stage to the output of that stage. The binary equations representing these values are:

$$G1[i] := A[i]*B[i] \quad (A[i] \text{ and } B[i]) \quad (3)$$

$$P1[i] := A[i]+B[i] \quad (A[i] \text{ or } B[i]) \quad (4)$$

The following truth table shows the relation between the inputs to the bit stage of FIG. 2 and the carry out, G1[i], and P1[i].

TABLE III

| A[i] | B[i] | CIN | G1[i] | P1[i] | C[i] |
|------|------|-----|-------|-------|------|
| 0 | 0 | 0 | 0 | 0 | 0 |
| 0 | 0 | 1 | 0 | 0 | 0 |
| 0 | 1 | 0 | 0 | 1 | 0 |
| 0 | 1 | 1 | 0 | 1 | 1 |
| 1 | 0 | 0 | 0 | 1 | 0 |
| 1 | 0 | 1 | 0 | 1 | 1 |
| 1 | 1 | 0 | 1 | 1 | 1 |
| 1 | 1 | 1 | 1 | 1 | 1 |

The generalized terms A[i], B[i], G1[i], and P1[i] mean that the terms refer to terms applicable to stage i. The generalized expression CIN means that the term refers to the carry signal produced by the next-less-significant bit stage. Thus, all of the terms in equations 3 and 4 and in Table III refer to a given bit stage, illustrated in FIG. 2, while the term CIN refers to the carry input to the blocks 19 and 21 from the next-less-significant bit stage of the adder.

The relationship between G1, P1, and C can be written as the following Boolean equation:

$$C[i] := G1[i] + P1[i]*CIN \quad (5)$$

Figure 3:
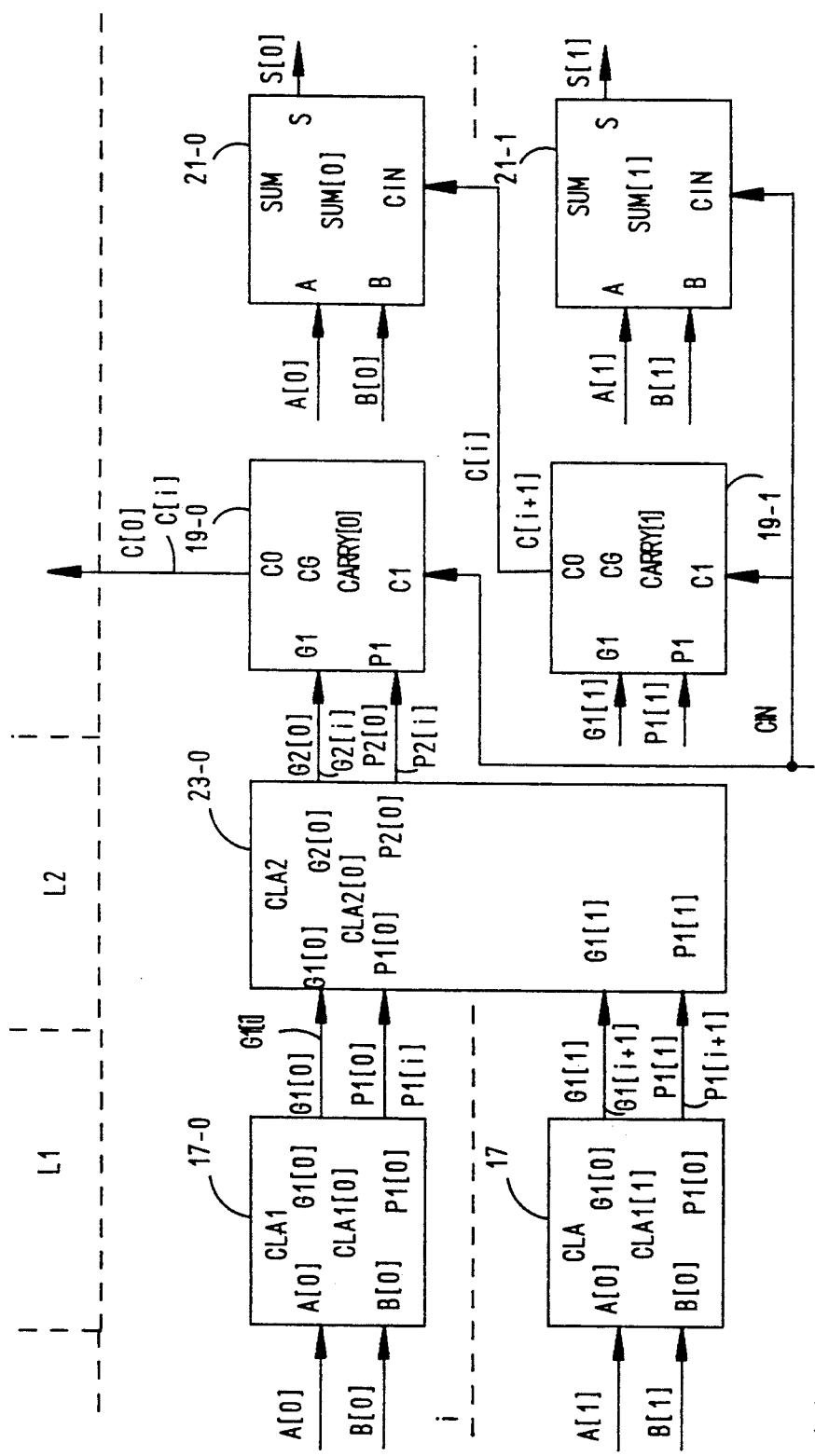
FIG. 3 is a block diagram of a two-bit carry lookahead adder.

The idea of "generate" and "propagate" terms can be expanded to groups of bits larger than one. FIG. 3 is a diagram of a two-bit carry lookahead adder. It includes two bit-stages i and i+1, each of which comprises a CLA1 circuit 17 for producing generate and propagate signals from the input signals A and B to that particular stage, a carry generate circuit 19 for deriving a carry signal from the generate and propagate signals and from the carry signal (CIN) to the adder, and a summing circuit 21 for deriving a sum signal from the carry out (CO) signal from the preceding, next-less-significant bit stage and the input bits A and B to the given stage. The "generate" and "propagate" terms for the two-bit stage (i) are produced by a second (L2) level CLA2 block 23-0, which comprises a group generate and a group propagate circuit receiving as their inputs the G1, P1 outputs of the CLA1 circuits 17-0 and 17-1 of the two- and one-bit-stages i and i+1.

Operation of the group generate and group propagate circuits incorporated in the CLA2 block 23-0 of FIG. 3 are expressed by the following equations:

$$G2[i] := G1[i] + P1[i]*G1[i + 1] \quad (6)$$
$$P2[i] := P1[i]*P1[i + 1] \quad (7)$$

The truth table for these equations is:

TABLE IV

| G1[i] | P1[i] | G1[i + 1] | P1[i + 1] | G2[i] | P2[i] |
|---|---|---|---|---|---|
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 0 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 0 | 0 | 0 | 1 | 0 |
| 1 | 0 | 0 | 1 | 1 | 0 |
| 1 | 0 | 1 | 0 | 1 | 0 |
| 1 | 0 | 1 | 1 | 1 | 0 |
| 1 | 1 | 0 | 0 | 1 | 0 |
| 1 | 1 | 0 | 1 | 1 | 1 |
| 1 | 1 | 1 | 0 | 1 | 0 |
| 1 | 1 | 1 | 1 | 1 | 1 |

The carries C[i] and C[i+1] for this two-bit adder may be produced by using the "generate" and "propagate" terms for stages i and i+1 and the carry into the least-significant-bit stage i+1. In Boolean terms:

$$C[i] := G2[i] + P2[i]*CIN \quad (8)$$
$$C[i + 1] := G1[i + 1] + P1[i + 1]*CIN \quad (9)$$

The generate and propagate circuits G1 and P1, which comprise the block CLA1, are shown in terms of their logical functions in FIG. 4, and the group generate and group propagate circuits G2 and P2, which comprise the block CLA2, are similarly shown in FIG. 5. The G2, P2 outputs of the CLA2 block 23-0 are applied to the CG block 19-0 associated with the two-bit stage i. The latter is shown in block form in FIG. 6. Circuits appropriate for use as CLA1, CLA2, and CG blocks are fully shown and described in applicant's copending U.S. patent application Ser. No. 07/480,188, filed Feb. 13, 1990, now U.S. Pat. No. 5,043,934 and assigned to the assignee of the present invention. The aforesaid copending application is incorporated herein in its entirety by this reference.

Certain labeling conventions used in FIG. 3 should be noted, because they will be used consistently throughout this document. The CLA1 blocks designate a pair of circuits whose logic functions are defined in FIG. 4. The CLA1 block associated with the most-significant bit stage i is labeled "CLA1[0]". The CLA1 block associated with the second-most-significant bit stage i+1 is particularly identified by the label "CLA1[1]". Inputs to and outputs from the CLA1 blocks CLA1[0] and CLA[1] are particularly identified with the suffixes "[0]" and "[1]", respectively.

The CLA2 block 23-0 to which the outputs of the CLA1 blocks 17-0 and 17-1 are applied, is additionally labeled "CLA2[0]", to designate the fact that its output reflects the inputs up to and including those to the CLA1[0] block of the most significant bit stage i. The generate and propagate circuits which comprise the CLA2 block 23-0 are defined by the equations shown in FIG. 5. The CLA2 circuits are distinguished from the CLA1 circuits by the fact that the CLA2 circuits are driven by generate and propagate signals, whereas the CLA1 circuits are driven by A and B bits. This distinction is signified throughout by referring to the circuits of CLA2 as "group generate" and "group propagate" circuits, and to the outputs of the CLA2 circuits as "group generate" and "group propagate" signals. This is in contrast to the CLA1 block circuits, which are referred to as "generate" and "propagate" circuits, whose outputs G1 and P1 are referred to throughout as "generate" and "propagate" signals.

In order to distinguish them from one another, for purposes of the various equations which will be given herein, the outputs of the CLA1, CLA2, and CG blocks are subscripted, to identify them with the stage with which they are associated. Thus, the generate and propagate outputs of the CLA1[0] block of stage i are labeled "G1[i]" and "P1[i]", whereas those of CLA1[1] circuit of stage i+1 are labeled "G1[i+1]" and "P1[i+1]".

Figure 7:
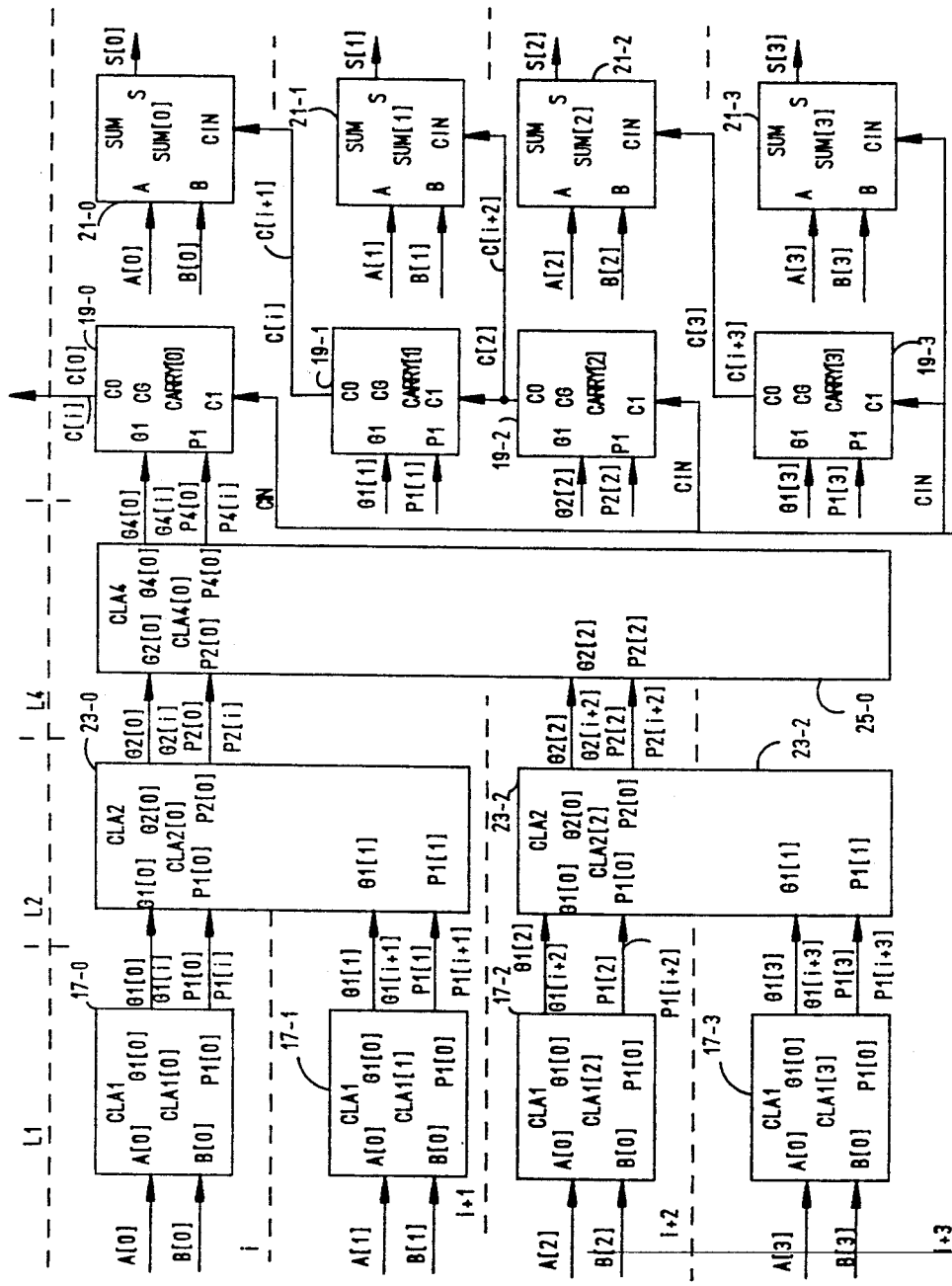
FIG. 7 is a block diagram of a four-bit carry lookahead adder.

FIG. 7 illustrates a four-bit carry lookahead adder built on the principles of the two-bit adder of FIG. 3. The generate and propagate terms for a four-bit group can be represented by the following Boolean equations:

$$G4[i] := G2[i] + P2[i]*G2[i + 2] \quad (10)$$
$$P4[i] := P2[i]*P2[i + 2] \quad (11)$$

It may be noted, by looking at the earlier equations for a two-bit adder, that the relationship between the generate and propagate terms of successive levels (i.e., G2 and G1 vs. G4 and G2, and also P2 and P1 vs. P4 and P2) is recursive.

Figure 8:
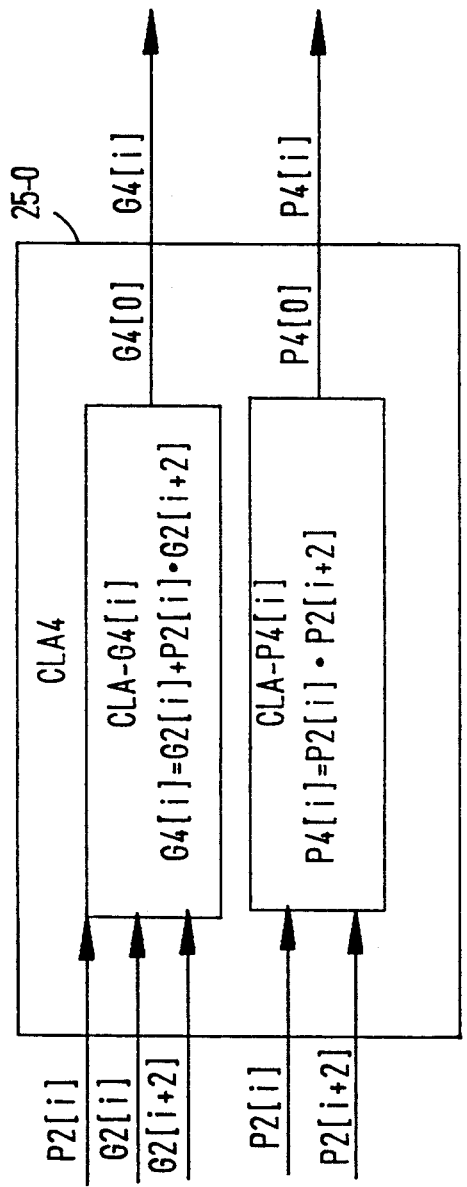
FIG. 8 is a block diagram of a pair of hierarchical group generate and group propagate circuits which form part of the FIG. 7 adder and which are at a higher hierarchical level than the circuits of FIG. 5.

The four-bit carry lookahead adder of FIG. 7 includes the elements associated with stages i and i+1 of the two-bit carry lookahead adder of FIG. 3 and a similar group of components for additional stages i+2 and i+3. In addition, the outputs of the two CLA2 circuits 23-0 and 23-2 are combined by means of an additional level of group generate and group propagate circuits, represented by the CLA4 block 25-0. The outputs of the CLA4 block are, in turn, applied to the CG circuit 19-0 associated with stage i. The group generate and group propagate circuits which comprise the CLA4 block 25-0 may be physically identical with those which comprise the CLA2 block 23-0 illustrated in FIG. 5, since they perform the same logical operations. The CLA4 block 25-0 is illustrated (in terms of its logical functions) in FIG. 8, its respective group generate and group propagate circuits being labeled "CLA-G4[i]" and "CLA-P4[i]". Most of the carries for the four-bit group produced by the adder of FIG. 7 may be produced by using the generate, propagate, group generate, and group propagate outputs of the CLA1, CLA2, and CLA4 circuits, as well as the carry (CIN) into the least-significant bit stage i+3. Boolean equations for these are $$C[i] := G4[i] + P4[i]*CIN \quad (12)$$
$$C[i + 2] := G2[i + 2] + P2[i + 2]*CIN \quad (13)$$
$$C[i + 3] := G1[i + 3] + P1[i + 3]*CIN \quad (14)$$

It will be noted that there is no equation for C[i+1]. That is because C[i+1] must be calculated with either an intermediate result (from CG block 19-2) or by a more complicated equation.

C[i+1] can be calculated using an intermediate result (C[i+2]), as represented by the following Boolean equation:

$$C[i+1] := G1[i+1] + P1[i+1]*C[i+2] \quad (15)$$

The disadvantage of this solution is that C[i+1] cannot be calculated until after C[i+2] has been calculated. This will result in an increase in the amount of time needed for the addition.

C[i+1] can be calculated with a more complicated equation, as follows:

$$C[i+1] := G1[i+1] + P1[i+1]*G2[i+2] + P1[i+1]*P2[i+2]*CIN \quad (16)$$

The disadvantage of this approach is that this more complicated equation would require a larger and slower gate to implement it.

Figure 9:
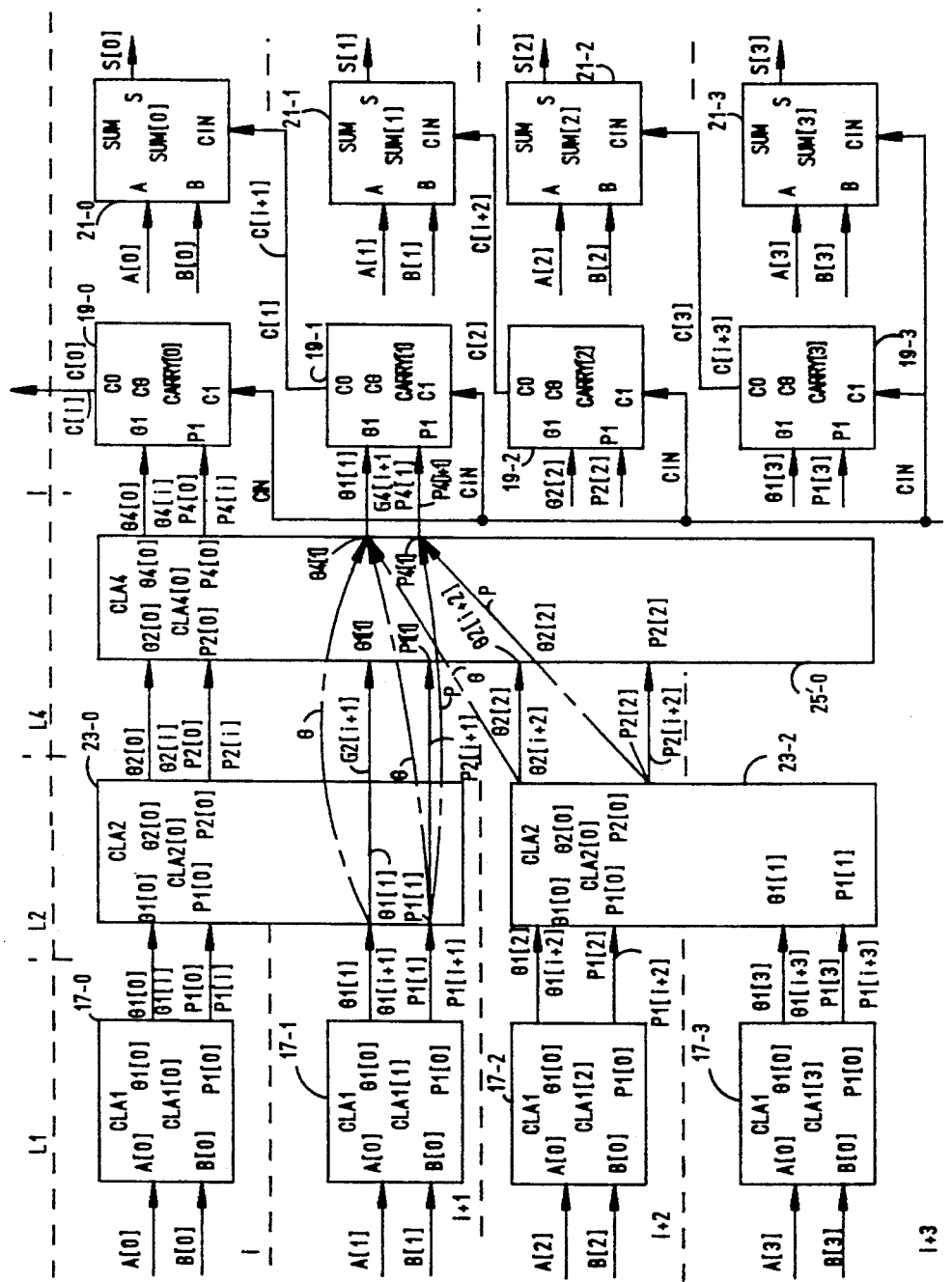
FIG. 9 is a block diagram of a four-bit carry lookahead adder similar to that shown in FIG. 7, but incorporating the present invention.

In accordance with the present invention, the need for an intermediate result is obviated without the need for a complex gate that might execute equation (16). FIG. 9 is a diagram of a four-bit carry lookahead adder incorporating this invention.

In accordance with the invention, "generate" and "propagate" terms for the bit stage [i+1] are produced by circuits which are organized to implement the following equations:

$$G4[i + 1] := G1[i + 1] + P1[i + 1]*G2[i + 2] \quad (17)$$
$$P4[i + 1] := P1[i + 1]*P2[i + 2] \quad (18)$$

These two values can be produced at the same time as G4[i] and P4[i]. This allows C[i+1] to be calculated at the same time as C[i], C[i+2], and C[i+3], using the following Boolean relationship:

$$C[i+1] := G4[i+1] + P4[i+1]*CIN \quad (19)$$

Figure 10:
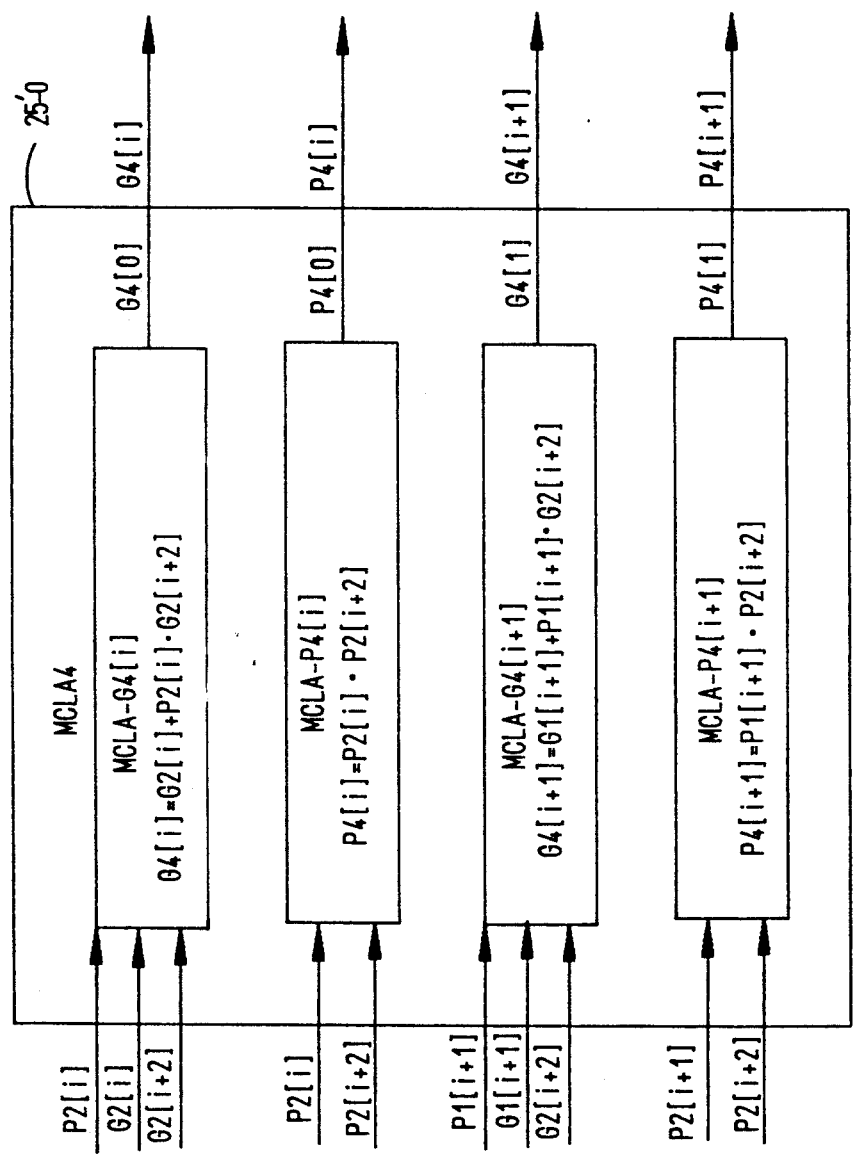
FIG. 10 is a block diagram of two group generate and group propagate circuit pairs which form part of the FIG. 9 adder, one pair corresponding to the hierarchical circuits of FIG. 8, the other, additional pair being non-hierarchical, according to the present invention.

The foregoing concepts are implemented in the four-bit carry lookahead adder of FIG. 9 by a set of group generate and group propagate circuits represented in FIG. 9 by the MCLA4 block 25'-0, whose circuits are shown in greater detail, in terms of the logic that they implement, in FIG. 10. A comparison of the representations of the MCLA4 block 25'-0 in FIGS. 9 and 10 will reveal that each of the four output nodes G4[0], P4[0], G4[1], and P4[1] in FIG. 9 represents a separate, complex logic gate which, in the same order are labeled in FIG. 10, "MCLA-G4[i]", "MCLA-P4[i]", "MCLA-G4[i+1]", and "MCLA-P4[i+1]", respectively. The same convention, it will be observed, has been followed throughout for each of the lower-level generate, propagate, group generate, and group propagate circuits and will be followed throughout this description with reference to progressively-higher-level group generate and group propagate circuits. It will also be noted that the required structure and connection for each of the circuits represented by the various nodes is adequately defined by the equations given in this specification, taken together with the system block diagrams, such as FIGS. 3, 7, and 9. For that reason, as this description proceeds to adders of a larger number of stages, only the equations and the system block diagrams will be used in order to conserve space and reduce the complexity of this description.

Comparison of the FIG. 7 and FIG. 9 four-bit adders will show that a very significant difference between the FIG. 9 adder, which incorporates the present invention, and the adder of FIG. 7, is that the group generate and group propagate circuits of the FIG. 7 adder are hierarchical, whereas, in the FIG. 9 four-bit carry lookahead adder, the additional group generate and group propagate circuits MCLA-G4[i+1] and MCLA-P4[i+1] (see FIG. 10) are non-hierarchical. A hierarchical group generate or group propagate as used herein refers to such a circuit whose inputs are limited to the outputs of the next-lower-level of group generate, group propagate or generate, propagate circuits. This is seen to be the case for all of the group generate and group propagate circuits illustrated in FIG. 7. In contrast, the additional group generate and group propagate circuits MCLA-G4[i+1] and MCLA-P4[i+1] (FIG. 10) receive their inputs not only from the level immediately below them in the pyramid of circuits, but from the next-lower level as well. To highlight this distinction, dashed lines labeled "P" have been provided between the node P4[1] in FIG. 9 and the output nodes P1[1] and P2[2], which provide inputs to the circuit represented by the node P4[1]. Similarly, dash lines labeled "G" have been provided in FIG. 9 between the output node G4[1], on the one hand, and the nodes G1[1], P1[1], and G2[2] to visually indicate what should also be apparent from the equations in FIG. 10, that the group generate circuit MCLA-G4[i+1] (FIG. 10), represented in FIG. 9 by the node G4[1], receives its inputs from the immediately-next-lower-level group generate circuit represented by the node G2[2] and by the still-lower-level outputs G1[1] and P1[1] produced by the CLA1 circuits 17-1.

By thus providing the additional term "G4[i+1]" and "P4[i+1]" to the CG circuit 19-1, there no longer is the need to derive the information pertaining to the states of stages i+2 and i+3 from the CG circuit 19-2 associated with the stage i+2, since that information has now been obtained from the G2[0] and P2[0] nodes of the CLA2 circuit 23-2 in FIG. 9. As a result, in contrast to the FIG. 7 adder, wherein the C[i+2] output of CG circuit 19-2 had to be used before the C[i+1] output of the next-higher-order CG circuit 19-1 could be produced, in the FIG. 9 circuit the CIN carry into the lowest-order stage i+3 may be used for all stages of the adder, including stage i+1, thereby avoiding the characteristic delay inherent in the FIG. 7 lookahead adder.

Figure 11A:
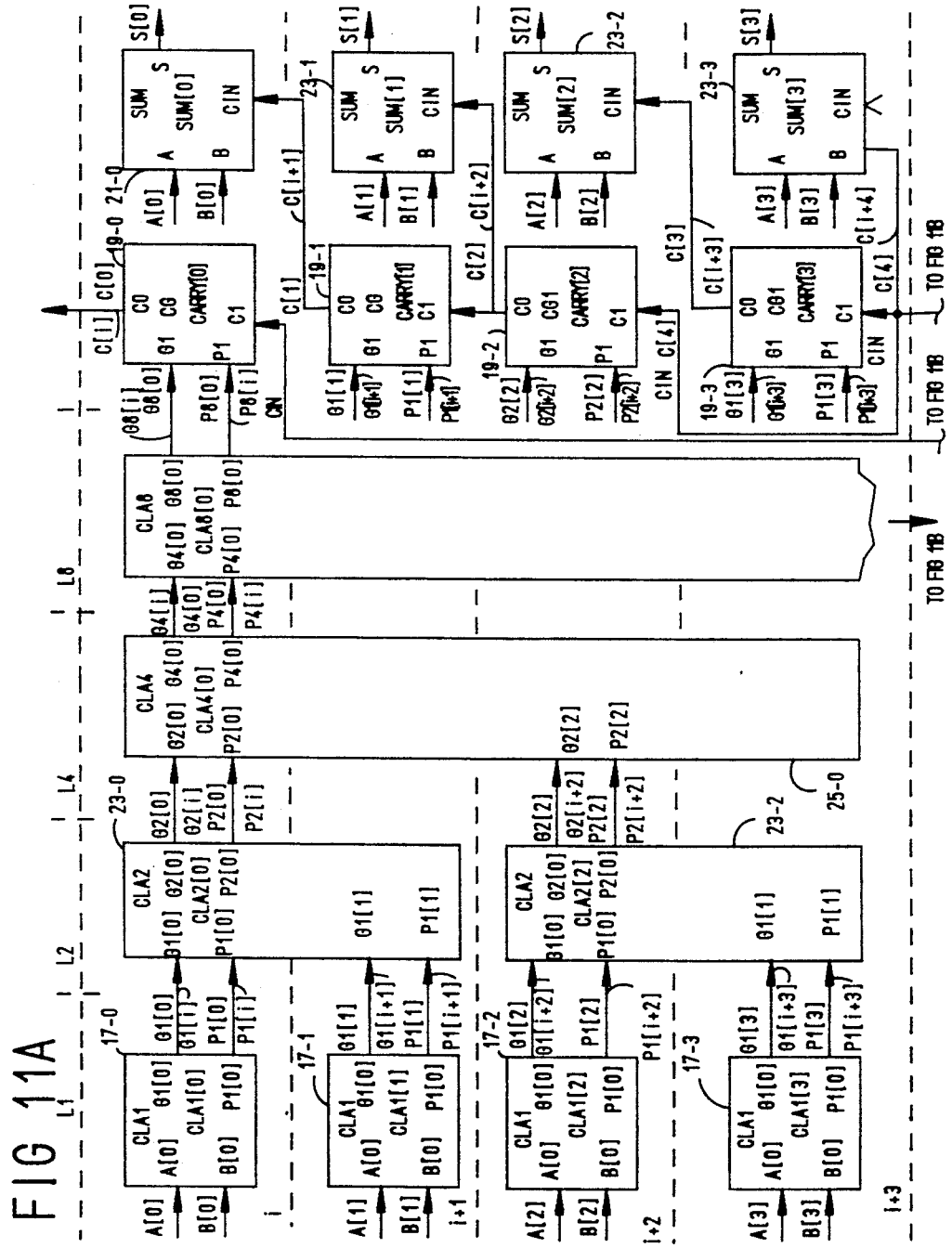
FIGS. 11A-11B are a block diagram of an eight-bit carry lookahead adder.
Figure 11B:
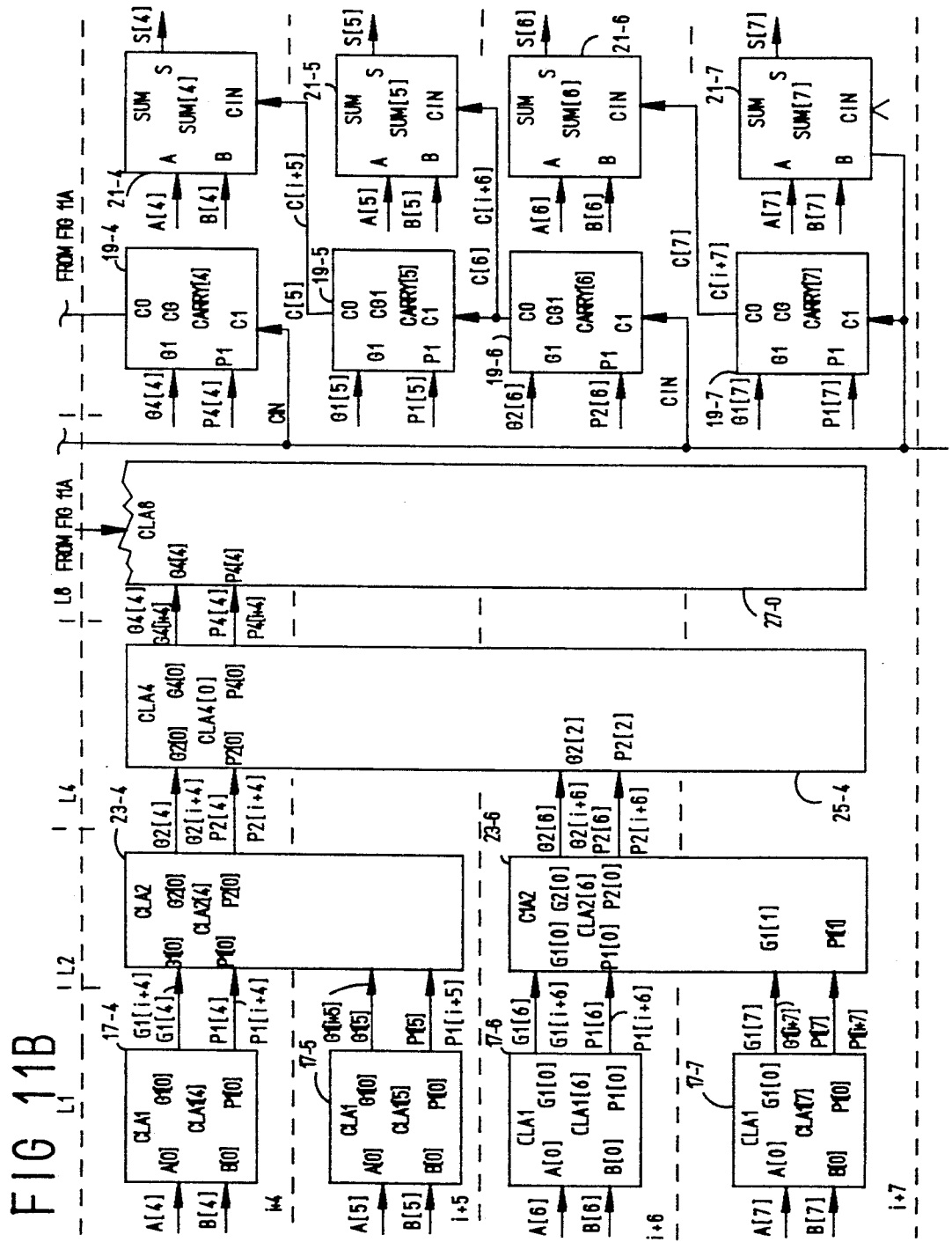

The advantage of the foregoing approach becomes even clearer when an eight-bit adder is considered. A diagram of a conventional eight-bit carry lookahead adder similar to and based on, the four-bit adder of FIG. 7 is shown in FIGS. 11A and 11B. The generate and propagate for an eight-bit adder can be calculated using the following Boolean relationship:

$$G8[i] := G4[i] + P4[i] * G4[i + 4] \quad (20)$$
$$P8[i] := P4[i] * P4[i + 4] \quad (21)$$

Carries in this eight-bit adder may be produced directly by circuits implementing the following equations:

$$C[i] := G8[i] + P8[i] * CIN \quad (22)$$
$$C[i + 4] := G4[i + 4] + P4[i + 4] * CIN \quad (23)$$
$$C[i + 6] := G2[i + 6] + P2[i + 6] * CIN \quad (24)$$
$$C[i + 7] := G1[i + 7] + P1[i + 7] * CIN \quad (25)$$

However, the carry signals C[i+1], C[i+2], C[i+3], and C[i+5] must be calculated either by using one of the carries C[i+4] or C[i+6], calculated in accordance with equations 23-24, or by means of a gate implementing a more complicated equation.

The following Boolean equations can be used to calculate the carries using the intermediate results of equations 23-24:

$$C[i + 2] := G2[i + 2] + P2[i + 2] * C[i + 4] \quad (26)$$
$$C[i + 3] := G2[i + 3] + P2[i + 3] * C[i + 4] \quad (27)$$
$$C[i + 5] := G1[i + 5] + P2[i + 5] * C[i + 6] \quad (28)$$

These carries must wait until C[i+4] and C[i+6] have been calculated. C[i+1] must also wait until C[i+2] has been calculated. It can be calculated as follows:

$$C[i+1] := G1[i+1] + P1[i+1] * C[i+2] \quad (29)$$

This means that C[i+1] will take two additional gate delays beyond C[i] to calculate.

The eight-bit carry lookahead adder of FIGS. 11A and 11B is built on the basis of the above-described concepts. It includes a four-level pyramid of generate, propagate, group generate, and group propagate circuits CLA1, CLA2, CLA4, and CLA8. Two sets of gates culminating respectively in CLA4 blocks 25-0 and 25-4 work into a single pair of group generate and group propagate circuits represented by the CLA8 block 27-0. The group generate and group propagate circuits represented by the CLA8 block 27-0 are represented by equations (20) and (21). Those two circuits simply represent another level in the pyramid of identical group generate and group propagate circuits which are interposed between the generate and propagate circuits 17 and the highest bit level CG circuit 19-0.

Figure 12A:
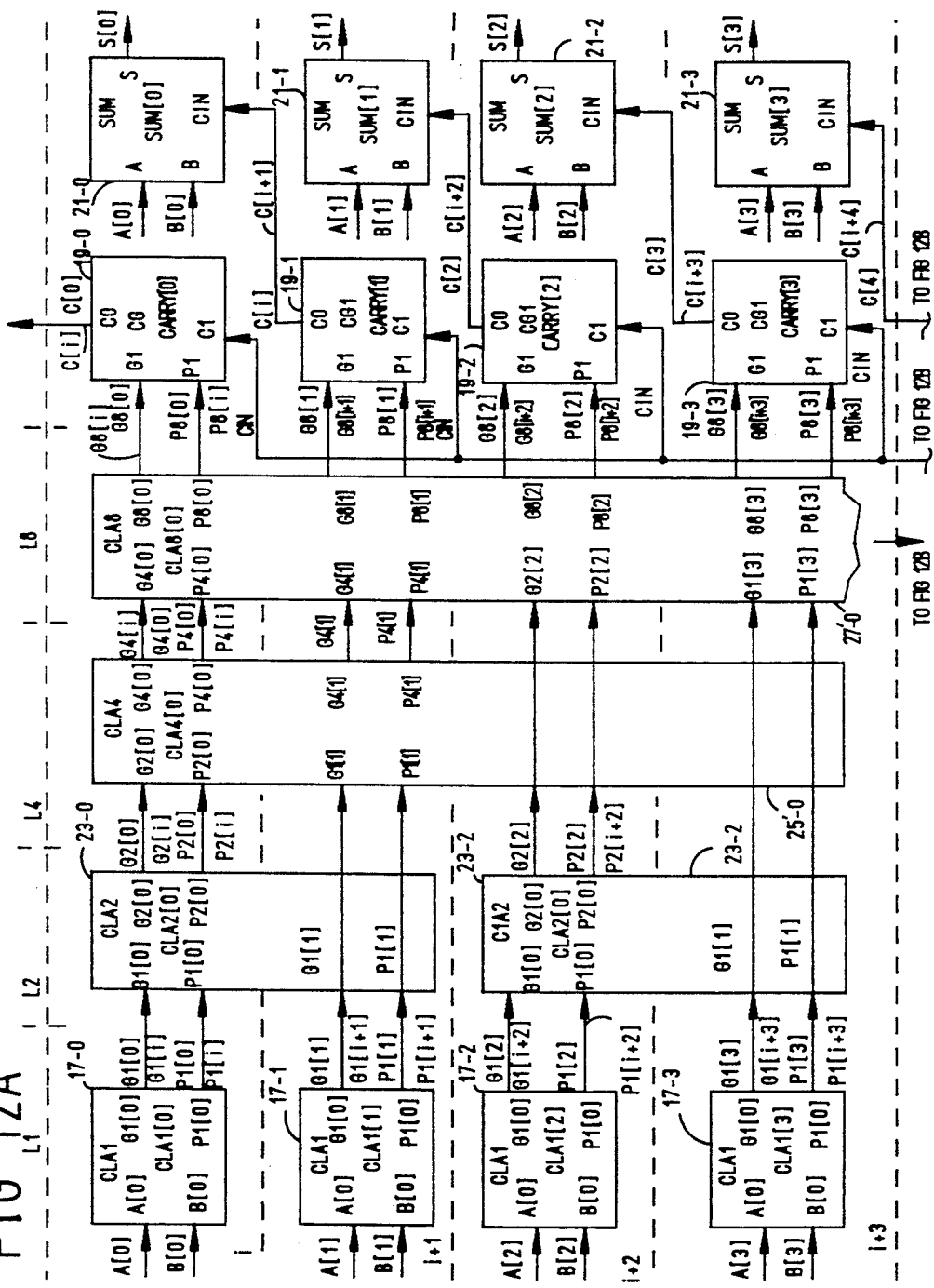
FIGS. 12A-12B are a block diagram of an eight-bit carry lookahead adder similar to that shown in FIG. 9, but incorporating the present invention.
Figure 12B:
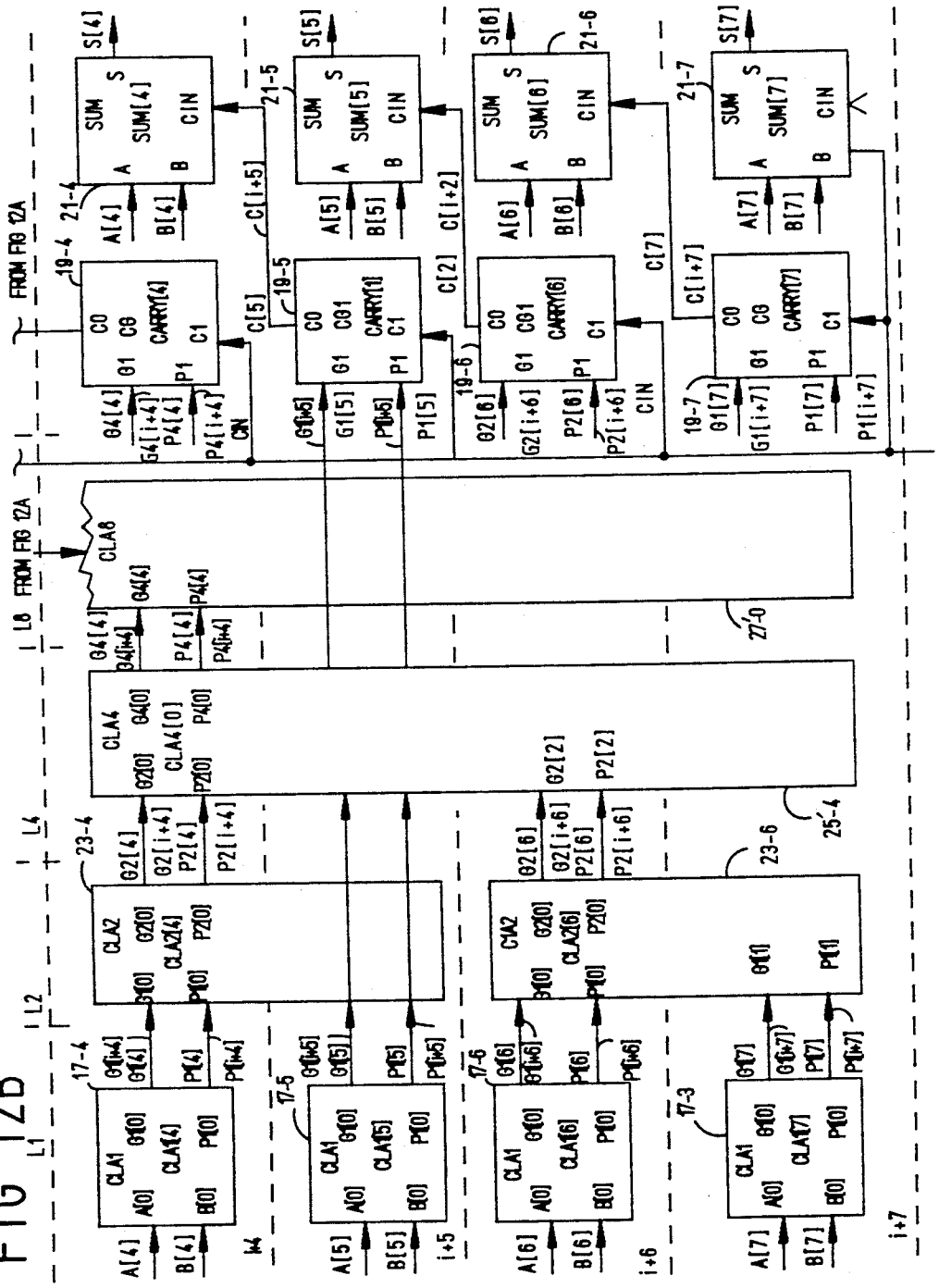

FIGS. 12A and 12B show a diagram of an eight-bit carry lookahead adder implemented according to the present invention.

The eight-bit carry lookahead adder of FIGS. 12A and 12B build upon and expand the techniques implemented in the four-bit carry lookahead adder of FIG. 9. Its pyramid structure, extending over four levels (L1, L2, L4, L8), comprises two sub-pyramids, respectively culminating in MCLA blocks 25'-0 and 25'-4. Each of these sub-pyramids may be identical to the pyramid structure of FIG. 9. The group generate and group propagate circuits comprising the highest level (8) represented by the MCLA8 block 27'-0 include a total of four pairs of group generate and group propagate circuits, the pair reflected by the output nodes G8[0] and P8[0], whose inputs are the same as those of the unimproved eight-bit carry lookahead adder of FIGS. 11A and 11B, and the additional pairs G8[1], P8[1], G8[2], P8[2], and G8[3], P8[3], whose inputs reach down to the outputs of gates, not only in the next-lower (L-4) level, but also to gates at the next two lower levels (L2, L1). These additional non-hierarchical group generate and group propagate pairs are defined by the equations which they implement, those equations being for the terms "G8[i+1]", "G8[i+2]", "G8[i+3]", and "P8[i+1]", "P8[i+2]", and "P8[i+3]".

In keeping with the invention, all of the carries in the eight-bit adder are calculated at the same time, by calculating the additional group generate and group propagate terms as just explained. The carries in the eight-bit adder are calculated according to the following equations:

$$C[i] := G8[i] + P8[i] * CIN \quad (30)$$
$$C[i + 1] := G8[i + 1] + P8[i + 1] * CIN \quad (31)$$
$$C[i + 2] := G8[i + 2] + P8[i + 2] * CIN \quad (32)$$
$$C[i + 3] := G8[i + 3] + P8[i + 3] * CIN \quad (33)$$
$$C[i + 4] := G4[i + 4] + P4[i + 4] * CIN \quad (34)$$
$$C[i + 5] := G4[i + 5] + P4[i + 5] * CIN \quad (35)$$
$$C[i + 6] := G2[i + 6] + P2[i + 6] * CIN \quad (36)$$
$$C[i + 7] := G1[i + 7] + P1[i + 7] * CIN \quad (37)$$

The additional generate and propagate terms in the equations above are "G8[i+1]", "P8[i+1]", "G8[i+2]", "P8[i+2]", "G8[i+3]" and "P8[i+3]". They are calculated as follows:

$$G8[i + 1] := G4[i + 1] + P4[i + 1] * G4[i + 4] \quad (38)$$
$$P8[i + 1] := P4[i + 1] * P4[i + 4] \quad (39)$$
$$G8[i + 2] := G2[i + 2] + P2[i + 2] * G4[i + 4] \quad (40)$$
$$P8[i + 2] := P2[i + 2] * P4[i + 4] \quad (41)$$
$$G8[i + 3] := G1[i + 3] + P1[i + 3] * G4[i + 4] \quad (42)$$
$$P8[i + 3] := P1[i + 3] * P4[i + 4] \quad (43)$$

Essentially, the above-described process represents taking groups, such as a four-bit group, and providing a group generate and a group propagate circuit for a sub-group consisting of the three least-significant bits. These group generate and group propagate circuits produce the G4[i+1] and P4[i+1] signals. In an eight-bit group, a group generate and a group propagate circuit is provided for each sub-group of the seven least-significant bits, six least-significant bits, and 5 least-significant bits. These group generate and group propagate circuits are G8[i+1], P8[i+1], G8[i+2], P8[i+2], G8[i+3], and P8[i+3], respectively. Calculating these additional generate and propagate signals allows the direct calculation of the carries from each bit in the group in one step with circuits such as those depicted in FIGS. 4, 5, 6, and 8.

Figure 13A:
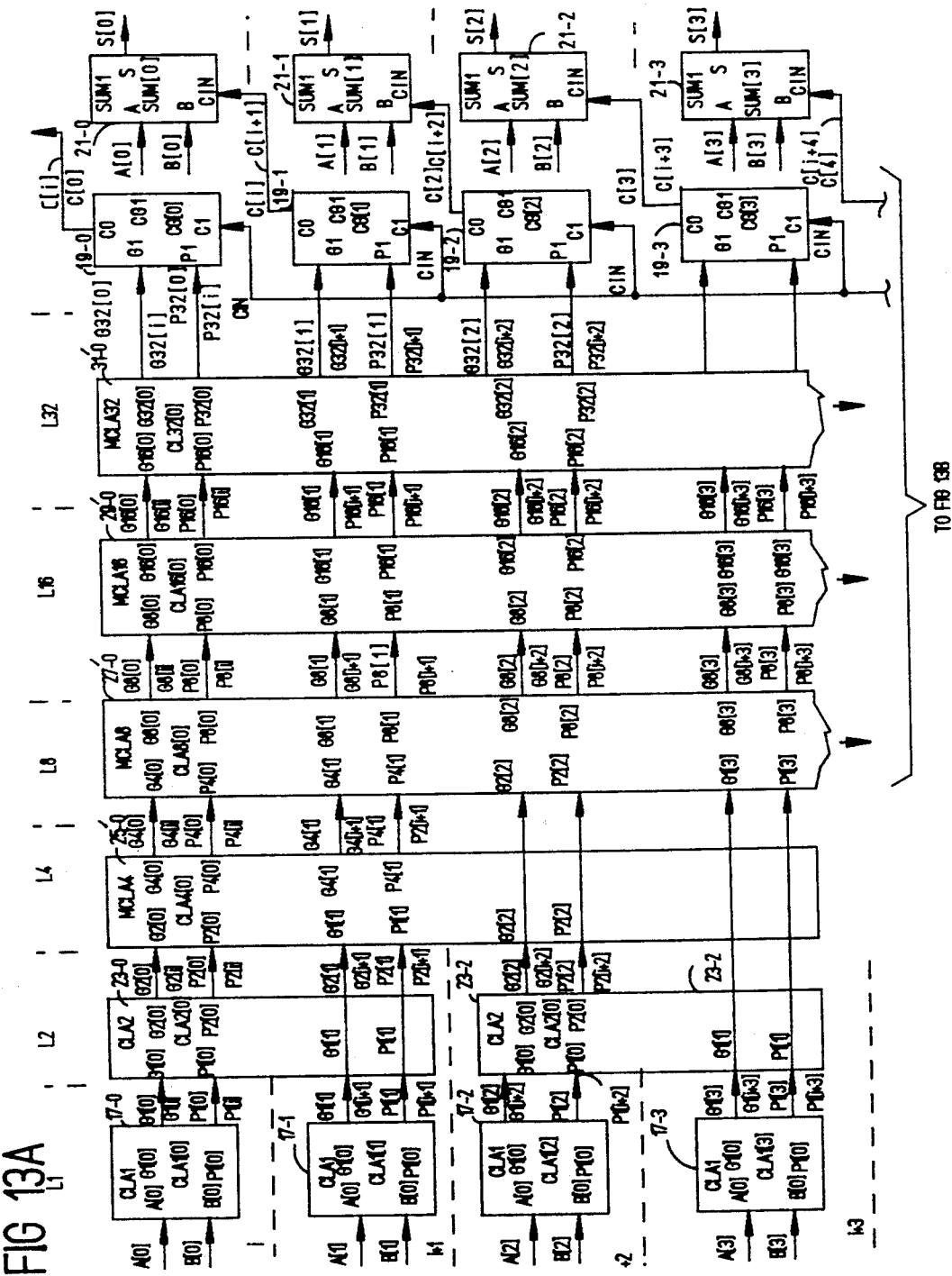
Figure 13B:
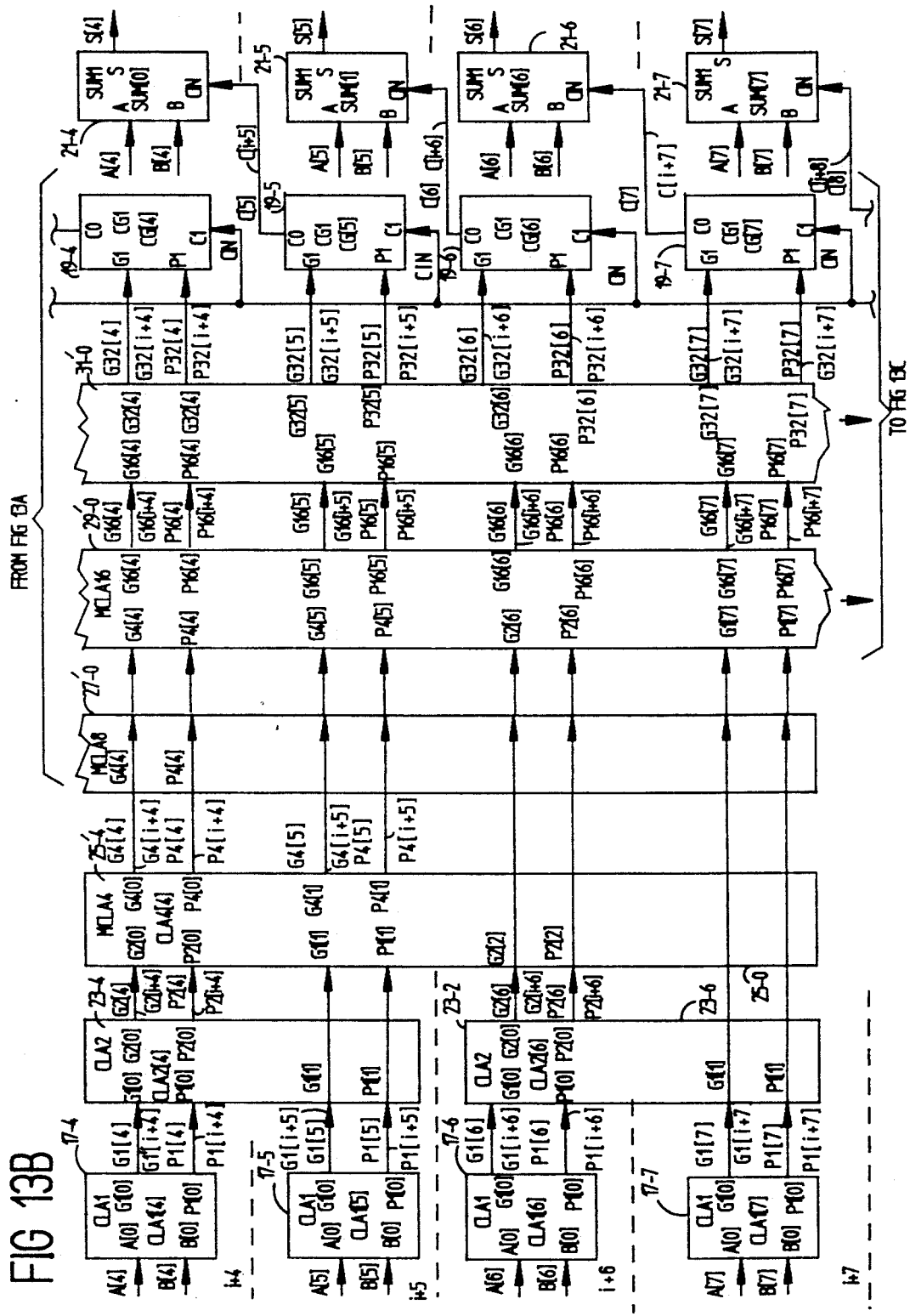
Figure 13C:
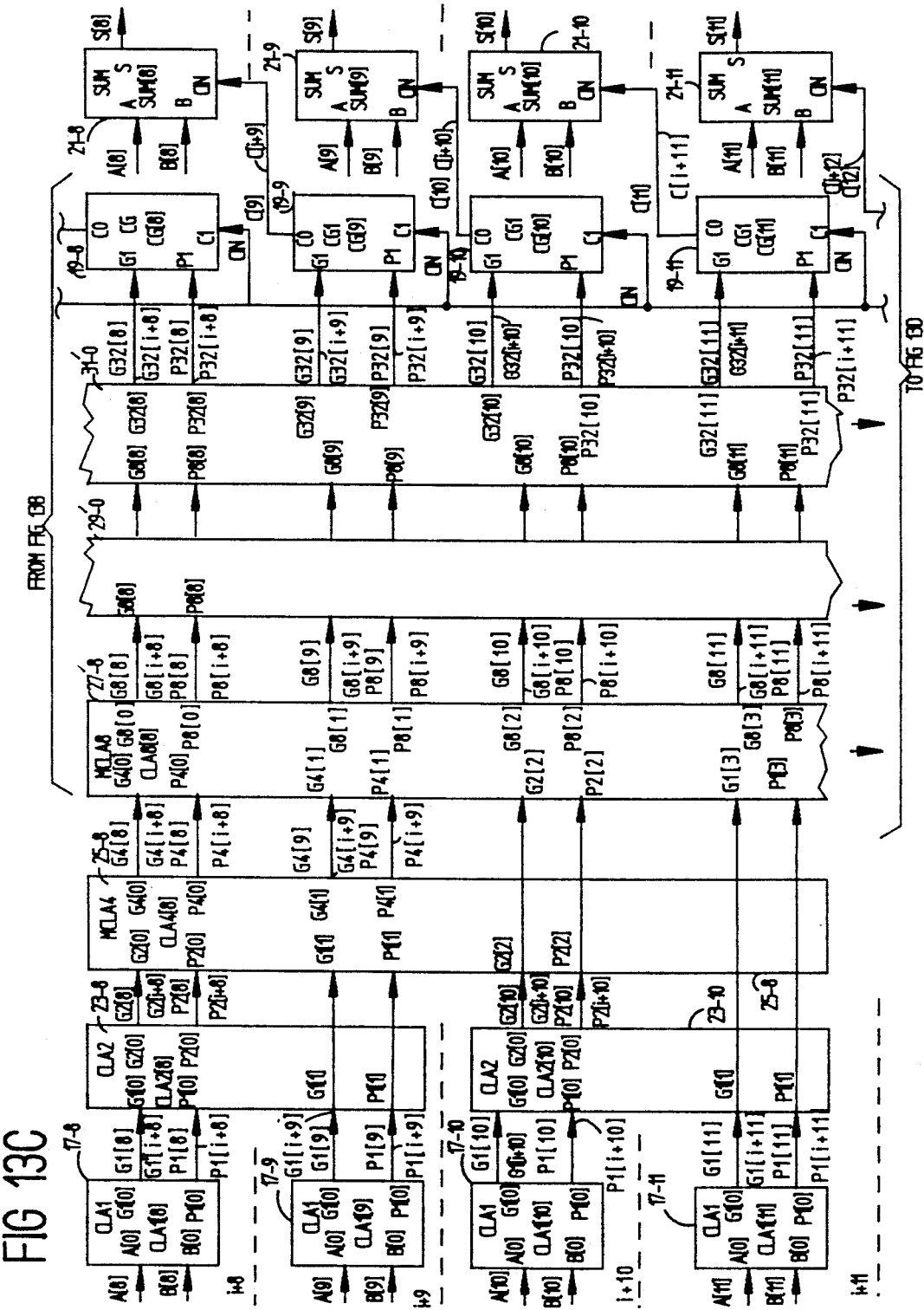
Figure 13D:
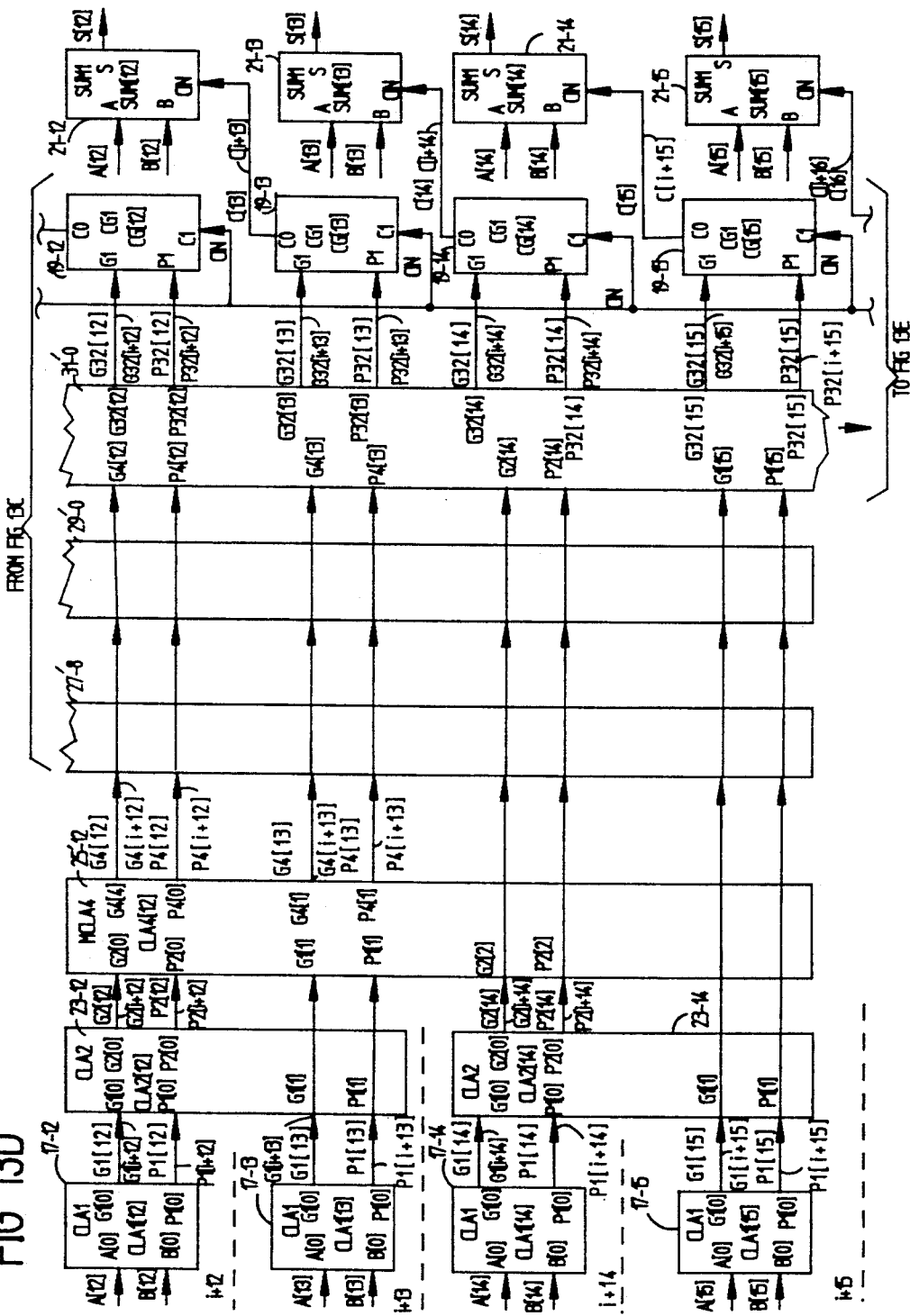
Figure 13E:
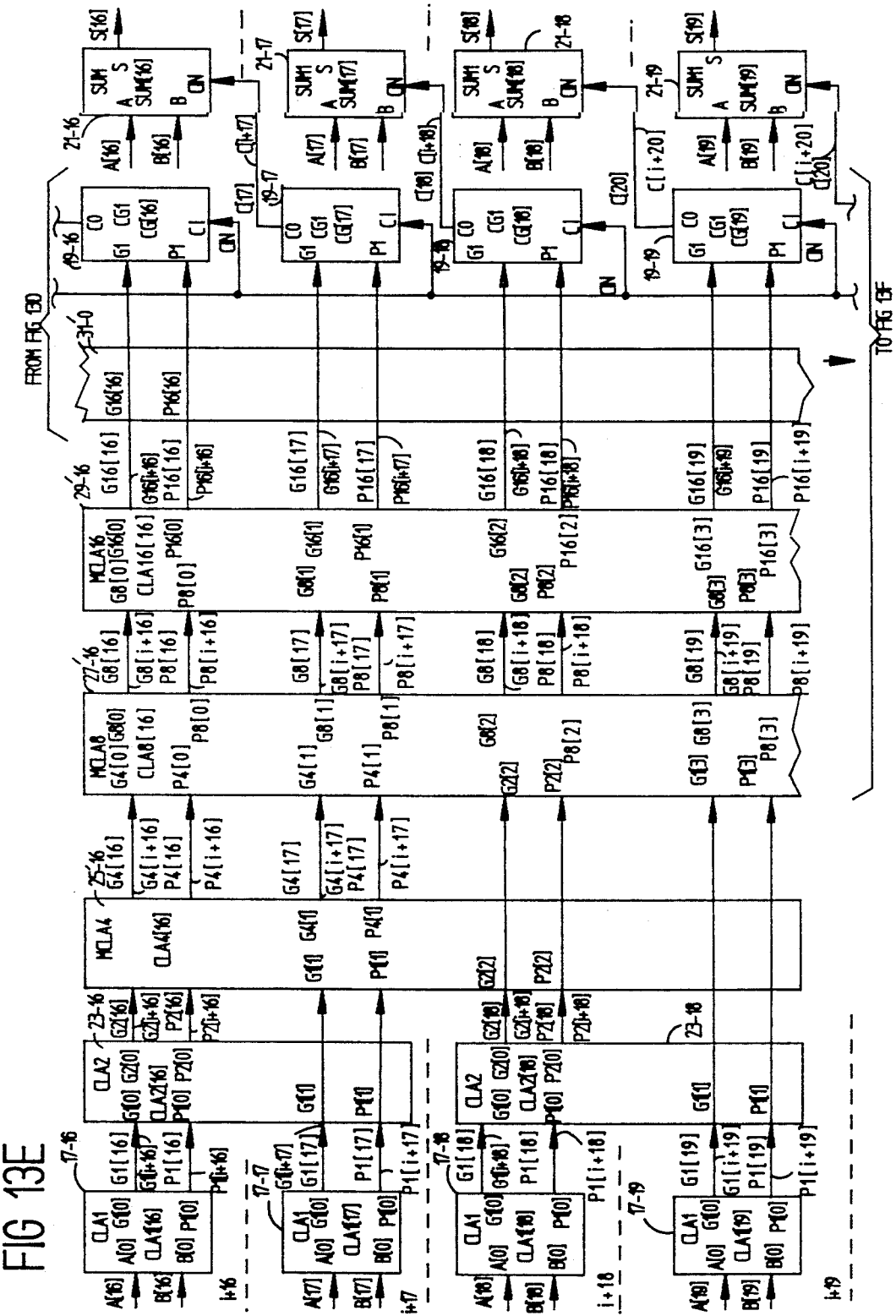
Figure 13G:
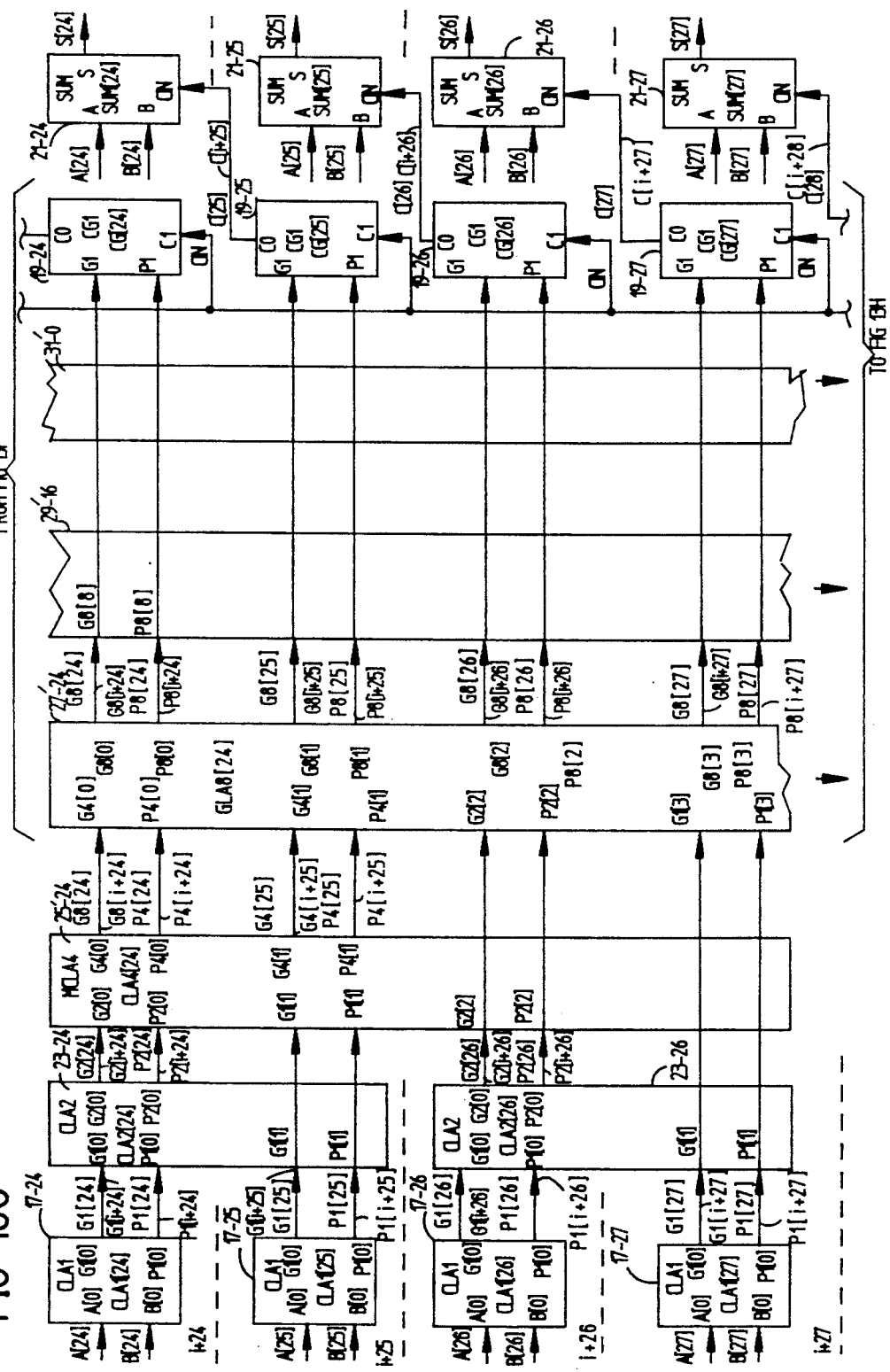
Figure 13H:
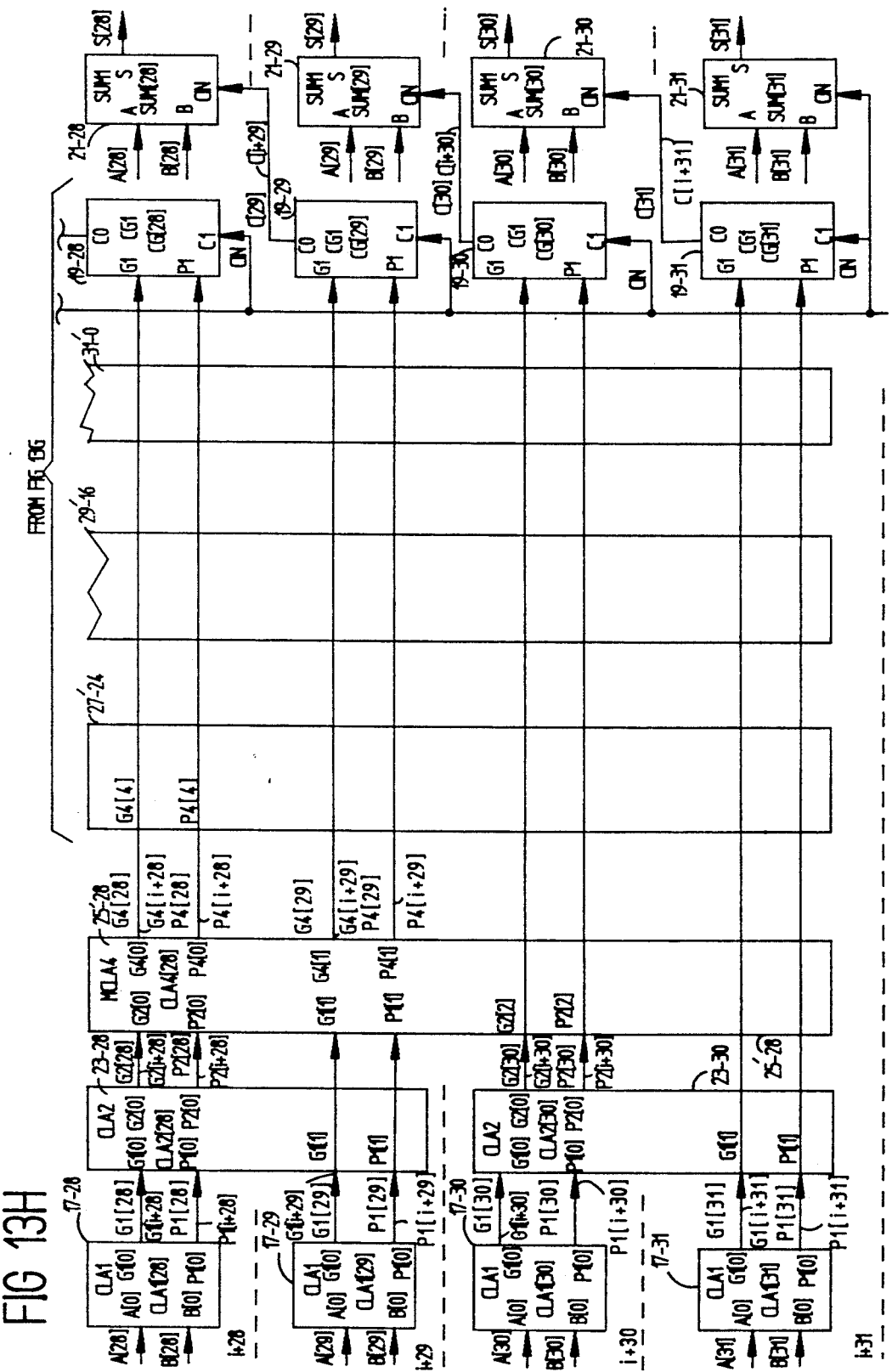

The present invention can be applied to 16- and 32-bit adders as well. FIGS. 13A-13B show a diagram of a 32-bit carry lookahead adder in accordance with the present invention. In addition to the block types CLA1, CLA2, MCLA4, and MCLA8, two block types MCLA16 and MCLA32 are provided. The adder carry generator section is made up of four sub-sections comprising CLA1, CLA2, MCLA4, and MCLA8 blocks identical to the arrangement shown in FIGS. 12A and 12B, and comprising those blocks. Two such sections associated with each of a pair of MCLA16 blocks 29'-0 and 29'-16 comprising a 16-bit generate, propagate subsection, the first associated with the upper 16 bits of the adder, stages i through i+15, and the second being associated with the lower 16 bits of the adder, stages i+16 through i+31. The output of each of the blocks MCLA16 is applied as an input to a hierarchical pair of generate and propagate circuits in the MCLA32 block 31'-0.

The two MCLA16 blocks of group generate and group propagate 29'-0 and 29'-16 are identical. The following equations represent the outputs of MCLA16 block 29'-0:

$$G16[i] := G8[i] + P8[i]*G8[i + 8] \quad (44)$$
$$P16[i] := P8[i]*P8[i + 8] \quad (45)$$
$$G16[i + 1] := G8[i + 1] + P8[i + 1]*G8[i + 8] \quad (46)$$
$$P16[i + 1] := P8[i + 1]*P8[i + 8] \quad (47)$$
$$G16[i + 2] := G8[i + 2] + P8[i + 2]*G8[i + 8] \quad (48)$$
$$P16[i + 2] := P8[i + 2]*P8[i + 8] \quad (49)$$
$$G16[i + 3] := G8[i + 3] + P8[i + 3]*G8[i + 8] \quad (50)$$
$$P16[i + 3] := P8[i + 3]*P8[i + 8] \quad (51)$$
$$G16[i + 4] := G4[i + 4] + P4[i + 4]*G8[i + 8] \quad (52)$$
$$P16[i + 4] := P4[i + 4]*P8[i + 8] \quad (53)$$
$$G16[i + 5] := G4[i + 5] + P4[i + 5]*G8[i + 8] \quad (54)$$
$$P16[i + 5] := P4[i + 5]*P8[i + 8] \quad (55)$$
$$G16[i + 6] := G2[i + 6] + P2[i + 6]*G8[i + 8] \quad (56)$$
$$P16[i + 6] := P2[i + 6]*P8[i + 8] \quad (57)$$
$$G16[i + 7] := G1[i + 7] + P1[i + 7]*G8[i + 8] \quad (58)$$
$$P16[i + 7] := P1[i + 7]*P8[i + 8] \quad (59)$$

CLA32 block 31'-0 implements the following equations:

$$G32[i] := G16[i] + P16[i]*G16[i + 16] \quad (60)$$
$$P32[i] := P16[i]*P16[i + 16] \quad (61)$$
$$G32[i + 1] := G16[i + 1] + P16[i + 1]*G16[i + 16] \quad (62)$$
$$P32[i + 1] := P16[i + 1]*P16[i + 16] \quad (63)$$
$$G32[i + 2] := G16[i + 2] + P16[i + 2]*G16[i + 16] \quad (64)$$
$$P32[i + 2] := P16[i + 2]*P16[i + 16] \quad (65)$$
$$G32[i + 3] := G16[i + 3] + P16[i + 3]*G16[i + 16] \quad (66)$$
$$P32[i + 3] := P16[i + 3]*P16[i + 16] \quad (67)$$
$$G32[i + 4] := G16[i + 4] + P16[i + 4]*G16[i + 16] \quad (68)$$
$$P32[i + 4] := P16[i + 4]*P16[i + 16] \quad (69)$$
$$G32[i + 5] := G16[i + 5] + P16[i + 5]*G16[i + 16] \quad (70)$$
$$P32[i + 5] := P16[i + 5]*P16[i + 16] \quad (71)$$
$$G32[i + 6] := G16[i + 6] + P16[i + 6]*G16[i + 16] \quad (72)$$
$$P32[i + 6] := P16[i + 6]*P16[i + 16] \quad (73)$$
$$G32[i + 7] := G16[i + 7] + P16[i + 7]*G16[i + 16] \quad (74)$$
$$P32[i + 7] := P16[i + 7]*P16[i + 16] \quad (75)$$
$$G32[i + 8] := G8[i + 8] + P8[i + 8]*G16[i + 16] \quad (76)$$
$$P32[i + 8] := P8[i + 8]*P16[i + 16] \quad (77)$$
$$G32[i + 9] := G8[i + 9] + P8[i + 9]*G16[i + 16] \quad (78)$$
$$P32[i + 9] := P8[i + 9]*P16[i + 16] \quad (79)$$
$$G32[i + 10] := G8[i + 10] + P8[i + 10]*G16[i + 16] \quad (80)$$
$$P32[i + 10] := P8[i + 10]*P16[i + 16] \quad (81)$$
$$G32[i + 11] := G8[i + 11] + P8[i + 11]*G16[i + 16] \quad (82)$$
$$P32[i + 11] := P8[i + 11]*P16[i + 16] \quad (83)$$
$$G32[i + 12] := G4[i + 12] + P4[i + 12]*G16[i + 16] \quad (84)$$
$$P32[i + 12] := P4[i + 12]*P16[i + 16] \quad (85)$$
$$G32[i + 13] := G4[i + 13] + P4[i + 13]*G16[i + 16] \quad (86)$$
$$P32[i + 13] := P4[i + 13]*P16[i + 16] \quad (87)$$
$$G32[i + 14] := G2[i + 14] + P2[i + 14]*G16[i + 16] \quad (88)$$
$$P32[i + 14] := P2[i + 14]*P16[i + 16] \quad (89)$$
$$G32[i + 15] := G1[i + 15] + P1[i + 15]*G16[i + 16] \quad (90)$$
$$P32[i + 15] := P1[i + 15]*P16[i + 16] \quad (91)$$

The carry signals C[i] through C[i+31] of FIGS. 13A-13H can be calculated in the respective CG blocks 19-0 through 19-31 directly from the outputs of the MCLA32 block 31'-0, the MCLA16 block 29'-16, the MCLA8 block 27'-24, the MCLA4 block 25'-28, the CLA2 block 23-30, and the CLA1 block 17-31, in accordance with the following equations:

$$C[i] := G32[i] + P32[i]*CIN \quad (92)$$

-continued
$$C[i + 1] := G32[i + 1] + P32[i + 1]*CIN \quad (93)$$
$$C[i + 2] := G32[i + 2] + P32[i + 2]*CIN \quad (94)$$
$$C[i + 3] := G32[i + 3] + P32[i + 3]*CIN \quad (95)$$
$$C[i + 4] := G32[i + 4] + P32[i + 4]*CIN \quad (96)$$
$$C[i + 5] := G32[i + 5] + P32[i + 5]*CIN \quad (97)$$
$$C[i + 6] := G32[i + 6] + P32[i + 6]*CIN \quad (98)$$
$$C[i + 7] := G32[i + 7] + P32[i + 7]*CIN \quad (99)$$
$$C[i + 8] := G32[i + 8] + P32[i + 8]*CIN \quad (100)$$
$$C[i + 9] := G32[i + 9] + P32[i + 9]*CIN \quad (101)$$
$$C[i + 10] := G32[i + 10] + P32[i + 10]*CIN \quad (102)$$
$$C[i + 11] := G32[i + 11] + P32[i + 11]*CIN \quad (103)$$
$$C[i + 12] := G32[i + 12] + P32[i + 12]*CIN \quad (104)$$
$$C[i + 13] := G32[i + 13] + P32[i + 13]*CIN \quad (105)$$
$$C[i + 14] := G32[i + 14] + P32[i + 14]*CIN \quad (106)$$
$$C[i + 15] := G32[i + 15] + P32[i + 15]*CIN \quad (107)$$
$$C[i + 16] := G16[i + 16] + P16[i + 16]*CIN \quad (108)$$
$$C[i + 17] := G16[i + 17] + P16[i + 17]*CIN \quad (109)$$
$$C[i + 18] := G16[i + 18] + P16[i + 18]*CIN \quad (110)$$
$$C[i + 19] := G16[i + 19] + P16[i + 19]*CIN \quad (111)$$
$$C[i + 20] := G16[i + 20] + P16[i + 20]*CIN \quad (112)$$
$$C[i + 21] := G16[i + 21] + P16[i + 21]*CIN \quad (113)$$
$$C[i + 22] := G16[i + 22] + P16[i + 22]*CIN \quad (114)$$
$$C[i + 23] := G16[i + 23] + P16[i + 23]*CIN \quad (115)$$
$$C[i + 24] := G8[i + 24] + P8[i + 24]*CIN \quad (116)$$
$$C[i + 25] := G8[i + 25] + P8[i + 25]*CIN \quad (117)$$
$$C[i + 26] := G8[i + 26] + P8[i + 26]*CIN \quad (118)$$
$$C[i + 27] := G8[i + 27] + P8[i + 27]*CIN \quad (119)$$
$$C[i + 28] := G4[i + 28] + P4[i + 28]*CIN \quad (120)$$
$$C[i + 29] := G4[i + 29] + P4[i + 29]*CIN \quad (121)$$
$$C[i + 30] := G2[i + 30] + P2[i + 30]*CIN \quad (122)$$
$$C[i + 31] := G1[i + 31] + P1[i + 31]*CIN \quad (123)$$

It should be understood that, whereas the previous discussion has been directed to an arrangement wherein the size of groupings double for each stage of the carry lookahead adder (i.e., one generate and one propagate [gate] in CLA1, two of each in CLA2, four of each in CLA4, and so on), the size of groupings can also multiply by four in each stage (i.e., four generate and propagate [gates] in CLA1, 16 in CLA2, 64 in CLA3, etc.)

From the foregoing, it is evident that there has been brought to the art of lookahead adders an improvement which significantly speeds up the operation of such adders by deriving directly from the input bits A and B by means by generate, propagate, group generate, and group propagate circuits, carry signals to each stage of the adder without requiring use of a carry signal from a previous stage of the adder.

What is claimed is:

1. In a lookahead adder having a series of summing stages, each for adding a respective pair of corresponding bits of two multi-bit binary numbers, each summing stage having a pair of A and B bit inputs and a carry input, a carry generator comprising:
   (a) a series of generate and propagate circuits, each associated with a successive one of said series of summing stages, each for producing a generate and a propagate signal in response to the A and B bit inputs received by its associated summing stage;
   (b) a plurality of group generate and group propagate circuits, each associated with a successive one of said series of summing stages and each producing a group generate and a group propagate signal,
   each said group generate circuit producing a group generate signal reflecting the outputs of all in said series of generate and propagate circuits up to and including the generate and propagate circuits associated with the summing stage with which said group generate circuit is associated
   each said group propagate circuit producing a group propagate signal reflecting the outputs of all in said series of propagate circuits up to and including the propagate circuit associated with the summing stage with which said group propagate circuit is associated; and (c) a series of carry generate circuits, one for each summing stage of said adder, the first of said series operative to generate a carry signal in response to a common carry-in signal and the generate and propagate signals produced by the generate and propagate circuits associated with the first of said series of summing stages, each of the remainder of said series operative to generate a carry signal in response to said common carry-in signal and to the group generate signal, and a group propagate signal produced by a respective one of said group generate and group propagate circuits associated with successive ones of said summing states.

2. The carry generator of claim 1, wherein:
(a) said series of generate and propagate circuits are arranged in subsets of $2^n$ generate and propagate circuits where n is a positive integer;
(b) said group generate and group propagate circuits are arranged in an array comprising a succession of progressively-higher-level sets of hierarchical and non-hierarchical group generate and group propagate circuits, and each member of the lowest-level set of group generate and group propagate circuits is connected to receive the generate and propagate outputs of a different subset of said generate and propagate circuits;
(c) hierarchical members of sets above the lowest-level set of group generate and group propagate circuits are connected to receive the group generate and group propagate outputs of a respective subset of group generate and group propagate circuits only in the next-lower-level set of group generate and group propagate circuits; and
(d) non-hierarchical members of sets above the lowest-level set of group generate and group propagate circuits are connected to receive the outputs of either:
   (i) both generate, propagate, and group generate, group propagate circuits, or
   (ii) the outputs of group generate and group propagate circuits belonging to sets at different levels.

3. The carry generator of claim 1, wherein:
(a) said adder comprises n stages;
(b) said generate and propagate circuits are arranged at a base level L1; and
(c) said group generate and group propagate circuits are arrayed at five progressively-higher levels L2, L4, L8, L16, and L32, each of said higher levels comprising n/2 group generate and group propagate circuits.

4. The carry generator of claim 3, wherein selected ones of the group generate and group propagate circuits at each of levels L2, L4, L8, L16, and L32 receive inputs from group generate and group propagate circuits at a plurality of said levels L2, L4, L8, L16 and from selected ones of said generate and propagate circuits at level L1.

5. The carry generator of claim 4, wherein the group generate circuits at level L32 receive inputs from the group generate circuits at each of levels L16, L8, L4, L2 and from a generate circuit at level L1, and wherein the group propagate circuits at level L32 receive inputs from group propagate circuits at each of levels L16 L8, L4, and L2.

6. In a carry generator for a lookahead adder having a series of summing stages, each for adding a respective pair of corresponding bits of two multi-bit binary numbers, each summing stage having a pair of A and B bit inputs and a carry input, said carry generator having:
(a) a series of generate and propagate circuits, each associated with a successive one of said series of summing stages, each for producing a generate signal and a propagate signal in response to the A and B bit inputs received by its associated summing stage; and
(b) a plurality of hierarchical group generate circuits and group propagate circuits arranged in a pyramid comprising several progressively-higher levels of group generate and group propagate circuits, with the group generate and group propagate circuits of each but the lowest level receiving the outputs of n of the group generate and group propagate circuits of the next-lower level, and with the group generate and group propagate circuits of the lowest level of said pyramid receiving the outputs of n of said generate and propagate circuits, and
(c) a series of carry generate circuits, one for each summing stage of said adder, the first of said series operative to generate a carry signal in response to a common carry-in signal and the generate and propagate signals produced by the generate and propagate circuits associated with the first of said series of summing stages, each of the remainder of said series operative to generate a carry-out signal in response to a respective group generate signal, a respective group propagate signal, and said common carry-in signal, the improvement comprising:
   (i) a plurality of non-hierarchical group generate circuits and group propagate circuits at different levels of said pyramid, at least some of said non-hierarchical group generate circuits being connected to receive the outputs of both generate, propagate and group generate, group propagate circuits at lower levels of said pyramid, and at least some of said non-hierarchical group propagate circuits being connected to receive the outputs of both propagate and other group propagate circuits at lower levels of said pyramid.

7. The carry generator of claim 6, wherein:
(a) said adder includes a series of progressively-less-significant stages i through i+7, each stage including a respective one of a series of corresponding summing stages SUM[i] through SUM[i+7], carry generate stages CG[i] through CG[i+7], generate circuits G[i] through G[i+7], and propagate circuits P[i] through P[i+7]; and
(b) the carry generate circuit CG[i+7] receives its inputs from the generate and propagate circuits G[i+7] and P[i+7], the carry generate circuits CG[i], CG[i+4], and CG[i+6] receive their inputs from the hierarchical group generate and group propagate circuits, and the carry generate circuits CG[i+1], CG[i+2], and CG[i+3] receive their inputs from the non-hierarchical group generate and group propagate circuits.

8. In a lookahead adder having a series of summing stages, each for adding a respective pair of corresponding bits of two multi-bit binary numbers, each summing stage having a pair of A and B bit inputs and a carry input, a carry generator comprising:
(a) a series of generate and propagate circuits, each associated with a successive one of said series of summing stages, each for producing a generate and a propagate signal in response to the A and B bit inputs received by its associated summing stage, said series of generate and propagate circuits arranged in subsets of $2^n$ generate and propagate circuits wherein is a positive integer;

(b) a plurality of group generate and group propagate circuits, each associated with a successive one of said series of summing stages and each producing a group generate and a group propagate signal, (i) each said group generate circuit producing a group generate signal reflecting the outputs of said series of generate and propagate circuits up to and including the generate and propagate circuits associated with the summing stage with which said group generate circuit is associated, (ii) each said group propagate circuit producing a group propagate signal reflecting the outputs of said series of propagate circuits up to and including the propagate circuit associated with the summing stage with which said group propagate circuit is associated;

(iii) said group generate and group propagate circuits arranged in an array comprising a succession of progressively-higher-level sets of hierarchical and non-hierarchical group generate and group propagate circuits, and each member of the lowest-level set of group generate and group propagate circuits connected to receive the generate and propagate outputs of a different subset of said generate and propagate circuits, (iv) hierarchical members of sets above the lowest-level set of group generate and group propagate circuits connected to receive the group generate and group propagate outputs of a respective subset of group generate and group propagate circuits only in the next-lower-level set of group generate and group propagate circuits; and (v) non-hierarchical members of sets above the lowest-level set of group generate and group propagate circuits connected to receive the outputs of either;

(aa) both generate, propagate, and group generate, group propagate circuits, or (bb) the outputs of group generate and group propagate circuits belong to sets at different levels, and (c) a series of carry generate circuits, one for each summing stage of said adder, the first of said series operative to generate a carry signal in response to a common carry-in signal and the generate and propagate signals produced by the generate and propagate circuits associated with the first of said series of summing stages, each of the remainder of said series operative to generate a carry signal in response to said common carry-in signal and to the group generate signal, and group propagate signal produced by a respective one of said group generate and group propagate circuits associated with successive ones of said summing stages.

* * * * *